United States Patent
Johnston

(10) Patent No.: US 8,171,022 B2
(45) Date of Patent: May 1, 2012

(54) METHODS, SYSTEMS, AND COMPUTER PROGRAM PRODUCTS FOR FACILITATING USER INTERACTION WITH CUSTOMER RELATIONSHIP MANAGEMENT, AUCTION, AND SEARCH ENGINE SOFTWARE USING CONJOINT ANALYSIS

(76) Inventor: Jeffrey M. Johnston, Durham, NC (US)

( * ) Notice: Subject to any disclaimer, the term of this patent is extended or adjusted under 35 U.S.C. 154(b) by 1449 days.

(21) Appl. No.: 11/268,673

(22) Filed: Nov. 7, 2005

(65) Prior Publication Data

US 2007/0233730 A1 Oct. 4, 2007

Related U.S. Application Data

(60) Provisional application No. 60/625,271, filed on Nov. 5, 2004.

(51) Int. Cl.
G06F 7/00 (2006.01)
G06F 17/30 (2006.01)

(52) U.S. Cl. .................. 707/733; 707/723; 707/732

(58) Field of Classification Search .................. None
See application file for complete search history.

(56) References Cited

U.S. PATENT DOCUMENTS

| | | | |
|---|---|---|---|
| 5,124,911 A * | 6/1992 | Sack | 705/10 |
| 5,495,412 A | 2/1996 | Thiessen | |
| 5,717,865 A | 2/1998 | Stratmann | |
| 5,742,776 A | 4/1998 | Toda | |
| 5,799,311 A | 8/1998 | Agrawal et al. | |
| 5,832,447 A | 11/1998 | Ricker et al. | |
| 5,897,639 A * | 4/1999 | Greef et al. | 707/999.103 |
| 5,926,794 A | 7/1999 | Fethe | |
| 6,064,984 A | 5/2000 | Ferguson et al. | |
| 6,249,768 B1 | 6/2001 | Tulskie, Jr. et al. | |
| 6,397,212 B1 | 5/2002 | Biffar | |
| 6,714,929 B1 | 3/2004 | Micaelian et al. | |
| 6,745,184 B1 * | 6/2004 | Choi et al. | 707/6 |
| 6,801,906 B1 | 10/2004 | Bates et al. | |
| 6,807,539 B2 | 10/2004 | Miller et al. | |
| 6,826,541 B1 | 11/2004 | Johnston et al. | |
| 6,895,405 B1 * | 5/2005 | Choi et al. | 707/101 |
| 6,928,434 B1 * | 8/2005 | Choi et al. | 707/6 |
| 2001/0010041 A1 * | 7/2001 | Harshaw | 705/10 |
| 2002/0004739 A1 | 1/2002 | Elmer et al. | |

(Continued)

OTHER PUBLICATIONS

File History of U.S. Patent No. 6,826,541 (Nov. 30, 2004).

(Continued)

*Primary Examiner* — Tim T Vo
*Assistant Examiner* — Garrett Smith
(74) *Attorney, Agent, or Firm* — Jenkins, Wilson, Taylor & Hunt, P.A.

(57) ABSTRACT

Methods, systems, and computer program products for combining conjoint analysis with customer relationship management software, search engine software, and auction software are disclosed. According to one method, conjoint analysis is used to facilitate user interaction with a search engine. According to the method, search keywords are received as a user and treated as attributes by a conjoint analysis application. The conjoint analysis application presents the user with paired trade-off questions regarding the search keywords. Conjoint analysis is performed based on user responses to the questions. Based on the user's responses to the questions, relative importance weightings are computed for keywords. The keywords and the relative importance weightings are input to a search engine. The search is performed using the keywords. Results to be output to the user are selected based on occurrences of the keywords in the search results and the relative importance weightings.

15 Claims, 15 Drawing Sheets

U.S. PATENT DOCUMENTS

| | | | |
|---|---|---|---|
| 2002/0076678 | A1 | 6/2002 | Westh |
| 2002/0087388 | A1 | 7/2002 | Keil et al. |
| 2003/0069780 | A1* | 4/2003 | Hailwood et al. ............... 705/10 |
| 2003/0069798 | A1 | 4/2003 | Hoffman |
| 2005/0055275 | A1* | 3/2005 | Newman et al. ................ 705/14 |
| 2006/0041401 | A1 | 2/2006 | Johnston |

OTHER PUBLICATIONS

"FEHB Program Carrier Letter," US Office of Personnel Management, pp. 1-2 (May 31, 2000).

"FEDmanager," www.fedmanager.com, pp. 1-3 (Nov. 16, 1999).

Bard, Mark, "Purchasing Health Care and Value," vol. 77, Issue 1, pp. 1-5 (Jan. 1998).

Interview Summary for U.S. Appl. No. 11/203,670 (Aug. 25, 2008).

Non-Final Office Action for U.S. Appl. No. 11/203,670 (Feb. 26, 2008).

Commonly-assigned, co-pending U.S. Appl. No. 11/203,670 for "Methods, Systems, and Computer Program Products for Facilitating User Choices Among Complex Alternatives Using Conjoint Analysis in Combination with Psychological Tests, Skills Tests, and Configuration Software," (Unpublished, filed Aug. 12, 2005).

Office Action in U.S. Appl. No. 09/704,349 (now U.S. Patent No. 6,826,541) (Aug. 26, 2003).

Office Action in U.S. Appl. No. 09/704,349 (now U.S. Patent No. 6,826,541) (Feb. 26, 2003).

Anonymous, www.asparity.com, web page printout (Feb. 6, 2002).

Anonymous, "The Power of Real-Time Collaborative Customer Conversations," p. 12, (Jan. 31, 2002).

Anonymous, "Our Customers Benefit From Powerful Partnerships," p. 1, (Jan. 31, 2002).

Anonymous, "Online Insight and Top 10 National Homebuilder Break New Ground Launching Online Home Finder Solution," p. 1-3, (Jan. 31, 2002).

Anonymous, www.beazer.com, web page printout, (Jan. 28, 2002).

Anonymous, www4.activebuyersguide.com, web page printout (Jan. 24, 2002).

O'Hara, Colleen, "Comparison Shop for Health Plans Online," Federal Computer Week, vol. 13, No. 7, pp. 1-2 (Mar. 22, 1999).

Screenshots of Decision Innovations, www.decision-innovations.com, pp. 1-10 (Dec. 6, 1998-Feb. 8, 1999).

"Federal Employees Health Benefits (FEHB)," www.opn.gov/insure, pp. 1-3 (Feb. 2, 1999).

"Decision Innovations Signs Agreement with U.S. Office of Personnel Management," PR Newswire, pp. 1-2 (Nov. 12, 1998).

"OPM Makes Life Easier for People Pondering Health Care Open Season Choices," OPM News Release, pp. 1-2 (Nov. 9, 1998).

"News Briefs: Tools Available for Selecting a Health Plan," NIH Record, pp. 1-6 (Nov. 3, 1998).

"Decision Innovations Signs Agreement with National Institute of Health," PR Newswire, pp. 1-2 (Oct. 30, 1998).

Appleby, Chuck, "Software for Hard Choices," Hospitals & Health Networks, vol. 72, No. 11, pp. 1-2 (Jun. 5, 1998).

"Partnerships '98, Showcase, and Games," www.odphp.osophs.dhhs.gov/confrnce/ partnr98, p. 1 (Apr. 28, 1998).

"California Consumer Health Scope," www.healthscope.org, pp. 1-3 (Feb. 3, 1998).

"Software by Decision Innovations Inc. Helps Employees Choose Heather Plans," PR Newswire, pp. 1-3 (Dec. 9, 1997).

*In re Remark*, 1990 WL 354512 (Bd. Pat. App. & Interf.), 15 U.S.P. G.2d 1498.

Final Official Action for U.S. Appl. No. 11/203,670 (Apr. 16, 2009).

Notice of Non-Compliant Amendment for U.S. Appl. No. 11/203,670 (Dec. 11, 2008).

Official Action for U.S. Appl. No. 11/203,670 (Jan. 21, 2010).

Interview Summary for U.S. Appl. No. 11/203,670 (Nov. 25, 2009).

Notice of Abandonement for U.S. Appl. No. 11/203,670 (May 10, 2011).

Final Official Action for U.S. Appl. No. 11/203,670 (Oct. 27, 2010).

\* cited by examiner

METHODS, SYSTEMS, AND COMPUTER PROGRAM PRODUCTS FOR FACILITATING USER INTERACTION WITH CUSTOMER RELATIONSHIP MANAGEMENT, AUCTION, AND SEARCH ENGINE SOFTWARE USING CONJOINT ANALYSIS

RELATED APPLICATIONS

The disclosures of U.S. Pat. No. 6,826,541, and U.S. provisional patent application No. 60/601,187, filed Aug. 12, 2004, are incorporated herein by reference in their entireties.

This application claims the benefit of U.S. provisional patent application No. 60/625,271, filed Nov. 5, 2004, the disclosure of which is incorporated by reference herein in its entirety.

TECHNICAL FIELD

The subject matter described herein relates to using a proven social science statistical technique called conjoint analysis to facilitate choices among complex alternatives. More particularly, the subject matter described herein relates to methods, systems and computer program products for facilitating user interaction with customer relationship management, auction, and search engine software using conjoint analysis. BACKGROUND ART As a research methodology, conjoint analysis has been in use in the academic and commercial research community for many years (since the mid-1970's), and has been commonly used for marketing research purposes to assess consumer preferences among competing products or services.

Generally, conjoint analysis is a tool that researchers use to estimate the relative importance of the attributes that comprise the "alternatives" in the "choice set" and how much utility each "setting" of each "attribute" has for individuals. Results are often used to simulate the effect on market share that various changes in the "attribute settings" have and thus to fine tune "alternatives" (e.g. identify the optimal price for a product) and to forecast market share. While many forms of conjoint analysis exist, there are two general defining properties of any conjoint process: 1) each at some point gathers data from individuals by asking each individual to consider (the "con" in conjoint) two or more variables simultaneously or jointly (the "joint" in conjoint) and 2) each uses the gathered data (responses) to estimate how much utility or value each "attribute setting." Typically, conjoint data is gathered from a sample of users and then analyzed with no flow of information back to the user. Thus, there exists a long-felt need for applications that use conjoint analysis to facilitate individual user choices among complex decisions by providing conjoint analysis results back to the user.

In addition to conjoint analysis, customer relationship management (CRM) software and auction software are examples of software which includes search and filtering tools. For example, customer relationship management software is used by tens of thousands of businesses to track customers and prospects and automate interaction between the company and the customer, client or prospect. Auction software on the Internet presents a user with products and product features on which they can search, allows the user to select desirable features, and presents available products that match the user's desired products for purchase. While conjoint analysis, customer relationship management software and auction software have been used individually to facilitate user selection of products or services among complex alternatives, there is no known method or system that combines conjoint analysis with customer relationship management software or auction software. Accordingly, there exists a long-felt need for improved methods and systems for facilitating user interaction with auction and customer relationship management software using conjoint analysis.

Yet another application that may benefit from conjoint analysis includes search engines, such as Internet search engines. Internet search engines produce hundreds or even thousands of results in response to a search using user-specified keywords. The volume of results in a typical search makes locating highly specific desired information difficult. Conjoint analysis allows users to select between complex alternatives and rates the alternatives. However, conjoint analysis has not been used with Internet search engines. Accordingly there exists a long felt need for methods, systems, and computer program products for facilitating user interaction with search engines using conjoint analysis.

SUMMARY

According to one aspect, the subject matter described herein may be implemented by a software tool that embodies a "conjoint" model decision process permitting the simplification of difficult choices among complex alternatives into a sequence of short, simpler decisions. "Alternatives" in this context can be products (such as automobiles, electronic equipment, consumer products, durable goods), services (such as consulting, health plans or home repair/renovations), combinations of complementary services and products, search engine keywords, or virtually anything else individuals must decide to choose or not choose. Complex "alternatives" are those defined in terms of many "variables" such that in the decision process a lot of information must be considered. Complex "alternatives" often create difficult decisions that demand that the chooser trade-off the good and bad in each "alternative." For example, the choice between a high-quality bicycle versus a low-quality bicycle, given quality is the only criterion used in the selection, is an easy one. However, as the alternatives become more complex, the choice becomes more difficult and trade-offs must be made. The choice between a high-quality, $500 bicycle that comes in pink only versus a low-quality, $100 bicycle that comes in either green, black, or blue is a more difficult decision than that based on quality only.

The subject matter described herein may use an adaptation of the conjoint model decision process. The use of the conjoint exercise allows to the tool to assist users in making difficult decisions less complex. By going through the exercise, unique profiles of what is important to the user are developed by the application.

In addition to developing user profiles, the subject matter described herein, at the end of the exercise, may provide users with a "quality of fit" measure of how well each product or service available to them meets their unique profile.

The subject matter described herein may be implemented using computer software that requires an individual user to go through a series of less complex choices. The software first presents the user with a list of features. The user selects features that are of importance to the user. The software then presents the user with a first series of choices requiring the user to input or select first values indicating the relative importance of a best setting and a worst setting of each of the selected features. The user is then presented with a second series of choices requiring the user to input or select second values indicating the relative importance of the user's preference between first and second pairings of the selected attributes. Each pairing includes a best setting of one attribute and a worst setting of another attribute. The values input by the user in the second series of choices are interpreted as the mathematical difference equal to the relative importance of a best and worst setting of one attribute minus the relative importance of a best and a worst setting for the other attribute in the pairing. A final importance value is calculated for each of the attributes based on the initial relative importance values in the first series of choices and the mathematical difference values. Products and services available to the user are rated based on the final importance values. The user is then presented with data indicating the relative utility to the user of each of the products or services.

Conjoint analysis may be used with customer relationship management software in any number of ways. For example, customer relationship management software results may be used to limit the attributes presented to an individual in the conjoint analysis. In an alternate implementation, customer relationship management results may be used to select and rank products or services presented to a customer. The interaction between the service provider and the customer can be automated. Automating these interactions can affect the results of the relationship between the seller of goods and services and the buyers of these same goods and services.

Conjoint analysis may similarly be used with auction software in any number of ways. For example, auction software may be executed by a user. The results of the execution may be used to limit the attributes that are presented to the user in the conjoint analysis. In an alternate implementation, conjoint analysis may be performed first and the results may be used to limit the product configurations made available to the user by the auction software.

Conjoint analysis may be used with Internet or other search engines to allow the user to select and prioritize search keywords and either limit or prioritize search results. For example, a user may perform a conjoint exercise to select a set of keywords and determine relative utilities or priorities of the keywords. The keywords and relative utilities may then be provided to a search engine. The search may be performed using the keywords, and the relative utilities may be used to rank the results.

Terminology

Before proceeding, a review of keywords and key phrases and their definitions used in this document is warranted. These keywords are placed in double quotes throughout the document to indicate their use may be somewhat different from common use.

| Keyword or Key Phrase | Definition |
| --- | --- |
| "user" | A person going through the software exercise to gain help in making a choice |
| "alternative" | A single product, service, or other choice (among a set of products, services, or choices) the "user" can potentially choose |
| "choice set" | All the "alternatives" the "user" is eligible to choose from |
| "attribute" | One of numerous variables, each defined as the continuum between its worst "setting" and best "setting," used to define the "alternatives" |
| "setting" (or "attribute setting") | The value a particular hypothetical or actual "alternative" has for a particular "attribute"; the hypothetical "alternatives" studied during the data-gathering phase of the algorithm are all specified in terms of the worst "setting" vs. the best "setting" for each "attribute," whereas |

-continued

| Keyword or Key Phrase | Definition |
| --- | --- |
| | actual "alternatives" available to the "user" may be specified by "settings" anywhere along each "attribute's" continuum |
| "importance" | A measure that the user gives directly via the importance-of-the-difference (between worst and best "settings") screens of the relative importance of a single "attribute" |
| "difference in importance" | A measure that the user gives directly via the trade-off screens of the (mathematical) difference in the "importance" of two "attributes" |
| "final computed importance" | A final estimate of the true relative importance of an "attribute" to a "user" |
| "setting utility" (or "attribute setting utility") | The relative (relative to all "attribute settings") worth or utility of a particular "attribute setting" (anywhere along the "attribute" continuum) to a particular "user" |
| "total utility" | The total relative (relative to all "alternatives" available to that user) worth or utility of a particular "alternative"; defined as the simple sum across "attributes" of the "setting utilities" |

To ensure these keywords and phases are understood, the following example is given.

A person is trying to make a choice between a medium-quality bicycle priced at $250 and a high-quality bicycle priced at $375. The person is given a tool that assists the person in the selection. The tool requires the person to state on a 1-to-5 scale the relative importance of quality and price. For purposes of this example, it is assumed that the person selects 5 and 4, respectively. The values "5" and "4" are "importance" measures as defined above. The tool also asks the person to rate to what degree the person would prefer a high-quality, $500 bicycle to a low-quality, $100 bicycle. In this example, it is assumed that the person indicates a preference for the higher quality, more expensive bicycle, a "+1" on a −4-to-+4 scale. The value +1 is a "difference in importance" value as defined above. The tool then computes that the true importance (on a 1-to-5 scale) of quality and price for this person is a 4.7 and a 4.1, respectively. The values 4.7 and 4.1 are "final computed importance" values, as defined above. These values are used in turn to compute that high quality is worth 25 (unitless) points to the person whereas medium quality is worth 15 points. The values "15" and "25" are "setting utilities" for the quality and price attributes. Similarly, the tool computes that $250 is worth 15 points to the person and $375 is worth 10. Thus, the tool computes that the total worth of the medium-quality bicycle priced at $250 is 30 points (15+15) and that the total worth of the high-quality bicycle priced at $375 is 35 points (25+10). The 30 and 35-point values are "total utility" values as defined above. Because 35 is higher than 30, the tool has computed that the medium-quality bicycle priced at $250 is worth slightly less to the person, all things considered, than the high-quality bicycle priced at $375. Thus, the tool recommends that the person should choose the high-quality bicycle priced at $375. The following table provides a summary of examples of each keyword or key phrase from the above example.

| Keyword or Key Phrase | Example |
| --- | --- |
| "user" | The person shopping for a bicycle |
| "alternative" | The medium-quality bicycle priced at $250 |

-continued

| Keyword or Key Phrase | Example |
|---|---|
| | and the high-quality bicycle priced at $375 are the actual "alternatives"; the high-quality, $500 bicycle and the low-quality, $100 bicycle are the hypothetical "alternatives" used in the data-gathering phase |
| "choice set" | The medium-quality bicycle priced at $250 and the high-quality bicycle priced at $375 together form the actual choice set for the "user"; the high-quality, $500 bicycle and the low-quality, $100 bicycle form a hypothetical "choice set" to which the "user" is asked to react. |
| "attribute" | Quality is an "attribute" as is price |
| "setting" (or "attribute setting") | $375 is an actual "setting" of price; $100 is a hypothetical "setting" for price |
| "importance" | The "5" given for quality |
| "difference in importance" | The "+1" |
| "final computed importance" | The "4.7" for quality |
| "setting utility" (or "attribute setting utility") | The "25" for the high-quality "setting" of quality |
| "total utility" | The "30" for the medium-quality bicycle priced at $250 "alternative" |

Exemplary goals of the subject matter described herein include user friendliness and applications. For example, it is desirable that the user interface be as user friendly as possible (keep it short and easy to understand). In addition, it is desirable to go beyond the end of traditional conjoint (developing "utilities") and apply these utilities to the performance of a set of products, services, or other choices, presenting the user with a sorted list of how well each product services or other choices meets their stated preferences or to enhance communication between the seller of goods and services and the client or customer purchasing or selecting these same goods, services, or other choices. In adapting a research statistical technique, traditionally used to study group preferences, and using it to match individual consumer preferences to actual products, services, or other choices, the subject matter described herein may be highly useful in the marketplace.

As mentioned above, conjoint has been in use since the 1970's. While there are a variety of implementations of the conjoint algorithm in the market the design chosen for implementation of the subject matter described herein is exceptionally simple, and yet robust. For example, features of real products, services, or other choices are evaluated and levels are created, so that products, services, or other choices can be compared by the application in a purely objective basis. The feature attribute descriptions are made as simple and as straightforward as possible. In addition, after the user completes the process of selecting attributes features of the product, service, or other choice making importance of difference decisions, and then trade-off decisions, results may be prescribed to the user in very simple bar-chart form. Products, services, or other choices may be presented to the user in priority order, based on how well each product matches the preference utility of that individual.

One exemplary algorithm that may be utilized by the subject matter described herein provides for paired trade-offs (two by two comparisons of end-point "attribute" characteristics) instead of the usual more complicated trade-offs involving more than two "attributes" defined not only by their end-points (best and worst "settings") but by numerous "settings" along their entire continuum. As used herein, the term "endpoints" refers to the best and worst settings of an attribute. For example, in the bicycle example discussed above, $100 and $500 are endpoints for the price attribute; whereas "high" and "low" are endpoints for the quality attribute.

According to another aspect of the subject matter described herein, an "X" matrix may be utilized to estimate "attribute" "utilities". An "X matrix", as described herein, is a configuration of explanatory variable data, or numbers, in a mathematical format. The "X matrix" designates the independent variable values used in the ordinary least squares matrix set, whereas the "Y Matrix" designates the dependent variable values. Examples of X and Y matrices and their use in calculating utilities for attributes will be discussed in more detail below.

Yet another aspect of the subject matter described herein is the way in which the results of a user's interaction are "fed back" to the user. For example, each individual's alternative choices of products, services or other choices may be ranked in declining order of "total utility." This way of "reporting" back to each user on how their priorities and decision criteria "value" each alternative clearly indicate the "best fit" choices among all the alternatives in an individual's "choice set."

While one use of the subject matter described herein is "attribute" preference-based decision support tool, databases of user-level "preference data" may be created (i.e. "final computed importance" and "setting utility" data) and other descriptive data. This data has value in the marketplace to producers and middleman organizations as conjoint research and can be used for developing analyses of market share "attribute" importance, and other outcomes of the decision-making process.

According to one aspect, the subject matter described herein includes a method for facilitating user choices among complex alternatives using conjoint analysis and customer relationship management software. The method may include performing a conjoint analysis using data obtained from a customer, a potential customer, or from a representative of a customer or potential customer. Results from the conjoint analysis may be used to drive a customer relationship management software application.

According to another aspect, the subject matter described herein includes a method for facilitating user interaction with auction software. The method may include obtaining a product feature set from a user and inputting the feature set as attributes to a conjoint analysis application. The method may further include presenting the user with paired trade-off questions regarding the feature set and performing conjoint analysis based on user responses to the questions. Based on the analysis, a feature set and relative utility weightings may be generated. The feature set and the relative utility weightings may be input to auction software. The keywords may be used to search a product data store. The relative utility weightings may be used to select products to be output in priority order to the user for bidding. This priority order could also allow the system to set parameters for the amount of money to bid on a prioritized list of products.

According to another aspect, the subject matter described herein may include a method for facilitating user interaction with a search engine using conjoint analysis. The method may include receiving search keyword from a user and inputting the search keywords as attributes to a conjoint analysis application. The user may be presented with paired trade-off questions regarding the keyword. Conjoint analysis may be performed based on user responses to the questions. Based on the analysis, keywords and relative utility weightings for the keywords may be generated. The keywords and relative utility weightings may be input to a search engine. The search may be performed using the keywords. The weightings may be used to select among results from the search to be output to the user.

BRIEF DESCRIPTION OF THE DRAWINGS

Preferred embodiments of the subject matter described herein will now be explained with reference to the accompanying drawings, of which.

DETAILED DESCRIPTION

Overview

Figure 1:
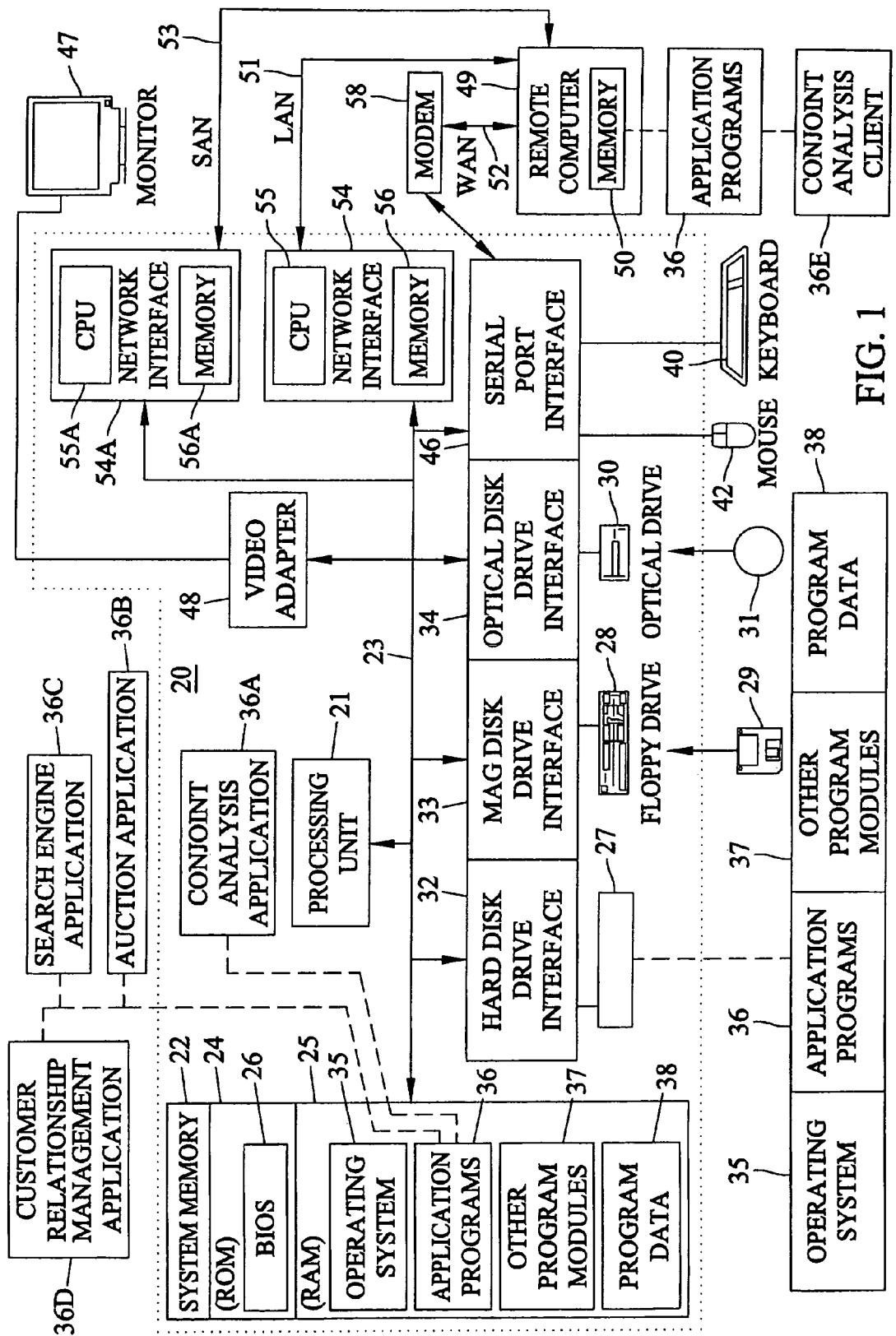
FIG. 1 is a block diagram illustrating an exemplary operating environment for embodiments of the subject matter described herein.

An automated conjoint analysis application suitable for use with embodiments of the subject matter described herein may implement at least three steps. Each of these steps through the exercise is interactive—that is, each step engages the "user" and requires the "user's" input. In addition, each step relies on the previous step. How the "user" responds in one step will affect what the user is asked to do in subsequent steps. At the end of these steps the user is provided with results. In applications that combine conjoint analysis with search engines, customer relationship management software, or auction software, the results from the conjoint analysis may be used to drive the CRM, auction, or search engine application. Details of exemplary interaction between a conjoint analysis application and these applications are provided below.

The main components of the tool are:
1. "Attribute" Selection—displayed as "Attribute Selection"
2. "Importance" Ratings—displayed as "Importance of Difference"
3. "Difference in Importance" Ratings—displayed as "Trade-Offs"
4. Results
5. Detailed "Alternative" Comparisons Software for implementing each of these steps will be discussed in more detail below following a discussion of the operating environment for the software.

Exemplary Operating Environment

Turning to the drawings, wherein like reference numerals refer to like elements, the subject matter described herein is illustrated as being implemented in a suitable computing environment. Although not required, the present subject matter will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the subject matter described herein may be practiced with other computer system configurations, including hand-held devices, multi-processor systems, microprocessor based or programmable consumer electronics, network PCs, minicomputers, mainframe computers, and the like. The subject matter described herein may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the subject matter described herein includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38.

A user may enter commands and information into the personal computer 20 through input devices, such as a keyboard 40 and a pointing device 42. Other input devices (not shown) may include a microphone, touch panel, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers. With regard to the subject matter described herein, the user may use one of the input devices to input data indicating the user's preference between alternatives presented to the user via monitor 47.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51, a wide area network (WAN) 52, and a system area network (SAN) 53. Local- and wide-area networking environments are commonplace in offices, enterprise-wide computer networks, intranets and the Internet.

System area networking environments are used to interconnect nodes within a distributed computing system, such as a cluster. For example, in the illustrated embodiment, the personal computer 20 may comprise a first node in a cluster and the remote computer 49 may comprise a second node in the cluster. In such an environment, it is preferable that the personal computer 20 and the remote computer 49 be under a common administrative domain. Thus, although the computer 49 is labeled "remote", the computer 49 may be in close physical proximity to the personal computer 20.

When used in a LAN or SAN networking environment, the personal computer 20 is connected to the local network 51 or system network 53 through the network interface adapters 54 and 54A. The network interface adapters 54 and 54A may include processing units 55 and 55A and one or more memory units 56 and 56A.

When used in a WAN networking environment, the personal computer 20 typically includes a modem 58 or other means for establishing communications over the WAN 52. The modem 58, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the present subject matter will be described with reference to acts and symbolic representations of operations that are performed by one or more computers, unless indicated otherwise. As such, it will be understood that such acts and operations, which are at times referred to as being computer-executed, include the manipulation by the processing unit of the computer and/or the processing units of I/O devices of electrical signals representing data in a structured form. This manipulation transforms the data or maintains it at locations in the memory system of the computer and/or the memory systems of I/O devices, which reconfigures or otherwise alters the operation of the computer and/or the I/O devices in a manner well understood by those skilled in the art. The data structures where data is maintained are physical locations of the memory that have particular properties defined by the format of the data. However, while the present subject matter is being described in the foregoing context, it is not meant to be limiting as those of skill in the art will appreciate that the acts and operations described hereinafter may also be implemented in hardware.

In FIG. 1, exemplary application programs 36 used to implement the subject matter described herein may include conjoint analysis application 36A, auction application 36B, search engine application 36C and customer relationship management application 36D. Conjoint analysis application 36A may present a user with trade-off questions relating to features of products being auctioned using auction application 36B. Alternatively, conjoint analysis application 36A may treat search engine keywords as conjoint attributes, perform conjoint analysis for the attributes, and output the keywords with relative utility or importance weightings to search engine application 36C. In yet another alternate implementation, conjoint analysis application 36A may receive user input regarding features of products or services, perform conjoint analysis on the user input, and make the results of the conjoint analysis available to the customer via customer relationship management application 36D.

Conjoint analysis application 36A may output a set of complex alternatives and relative utilities, which may be input to auction application 36B, search engine application 36C, or customer relationship management application 36D. Alternatively, conjoint analysis application 36A may be used to present a user with paired trade-offs relating to complex alternatives output by auction application 36B, search engine application 36C, or customer relationship management application 36D and weight the relative utilities of the output.

Auction application 36B may be any suitable software that presents products or services to a user for purchase via an auction. An example of commercially available auction software suitable for use with the embodiments of the subject matter described herein includes eBay® auction software provided by www.ebay.com. It is understood that such software may execute within a web browser and may only temporarily be installed on a user's machine.

Search engine application 36C may be any suitable software that searches a database based on keywords entered by a user. One example of commercially available search engine software suitable for use with embodiments of the subject matter described herein is Google® search engine software provided at www.google.com. Other examples of search engine software includes database software that searches a database local to a user's computer.

Customer relationship management software may be any suitable software that manages relationships between a client and a customer. One example of customer relationship management software operates in the real estate domain and accepts preference and profile data from potential real estate customers. The software attempts to match customers with online real estate listings. Online real estate listings may be communicated to the customer by the customer relationship management software. Conjoint analysis application 36A may be used to select the alternatives that are presented to the user.

Conjoint analysis application 36A preferably performs the functions of presenting the user with a series of choices relating to complex alternatives, calculating relative utility scores of the alternatives based on the choices, and feeding back to the user an indication of which of the complex alternatives has the highest utility for that user. Conjoint analysis application 36A may also combine customer relationship management (CRM) software search engines, and/or auction software with conjoint analysis. Conjoint analysis client 36B may establish a connection with conjoint analysis application 36A in order to provide communications between the user and conjoint analysis application 36A. In a preferred embodiment, conjoint analysis client 36B comprises a web browser, such as Internet Explorer available from Microsoft Corporation of Redmond, Washington, or Netscape Navigator available from America Online Corporation of Reston, Va.

The present subject matter is not limited to conjoint analysis software that is implemented as a server and a client connected via a network. For example, in an alternative embodiment, the subject matter described herein may be implemented entirely on a local machine wherein the conjoint analysis software comprises an application program that presents the user with a series of choices relating to complex alternatives, calculates the relative utilities of the complex alternatives, and feeds the relative utility information back to the user entirely on the local machine. However, a networked environment is preferred so that multiple users can access the conjoint analysis application. For example, conjoint analysis application 36A may be resident on a server accessible by end users. In this manner, end users may access conjoint analysis application 36A using a web browser that is common on most personal computers. The results of the conjoint analysis may be transmitted to a search engine website and used to conduct a search using keywords and optionally weights for each keyword output by the conjoint analysis.

Figure 2:
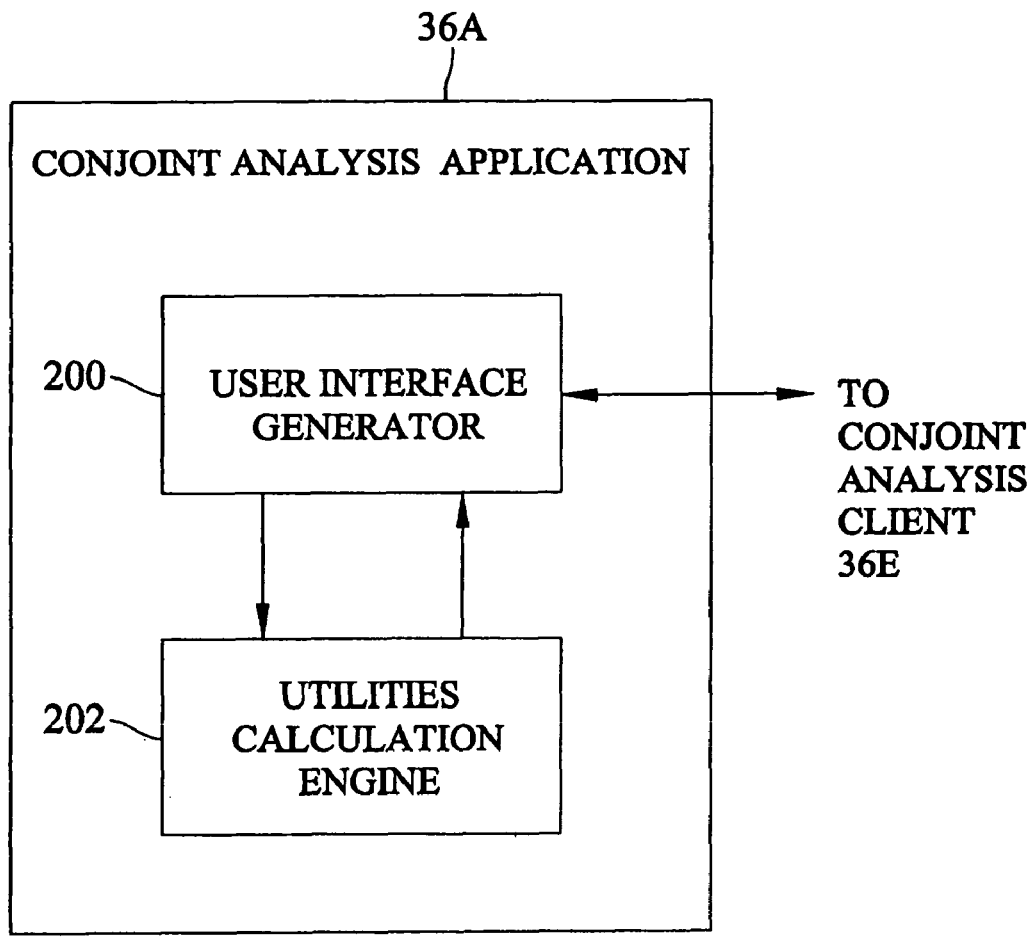
FIG. 2 is a block diagram of a conjoint analysis application suitable for use with embodiments of the subject matter described herein.

FIG. 2 is a block diagram of conjoint application 36A. In the illustrated embodiment, conjoint analysis application 36A includes a user interface generator 200 and a utilities calculation engine 202. User interface generator 200 may be a web server. User interface generator 200 preferably presents a series of input screens to the user relating to choices between complex alternatives. User interface generator 200 also receives input from the user and delivers that input to utilities calculation engine 202. Utilities calculation engine 202 calculates a total relative utility value for each of the complex alternatives, based on the user choices. Utilities calculation engine 202 outputs the total utilities calculations to user interface generator 200. User interface generator 200 then outputs the total utilities values to conjoint analysis client 36E.

Figure 3:
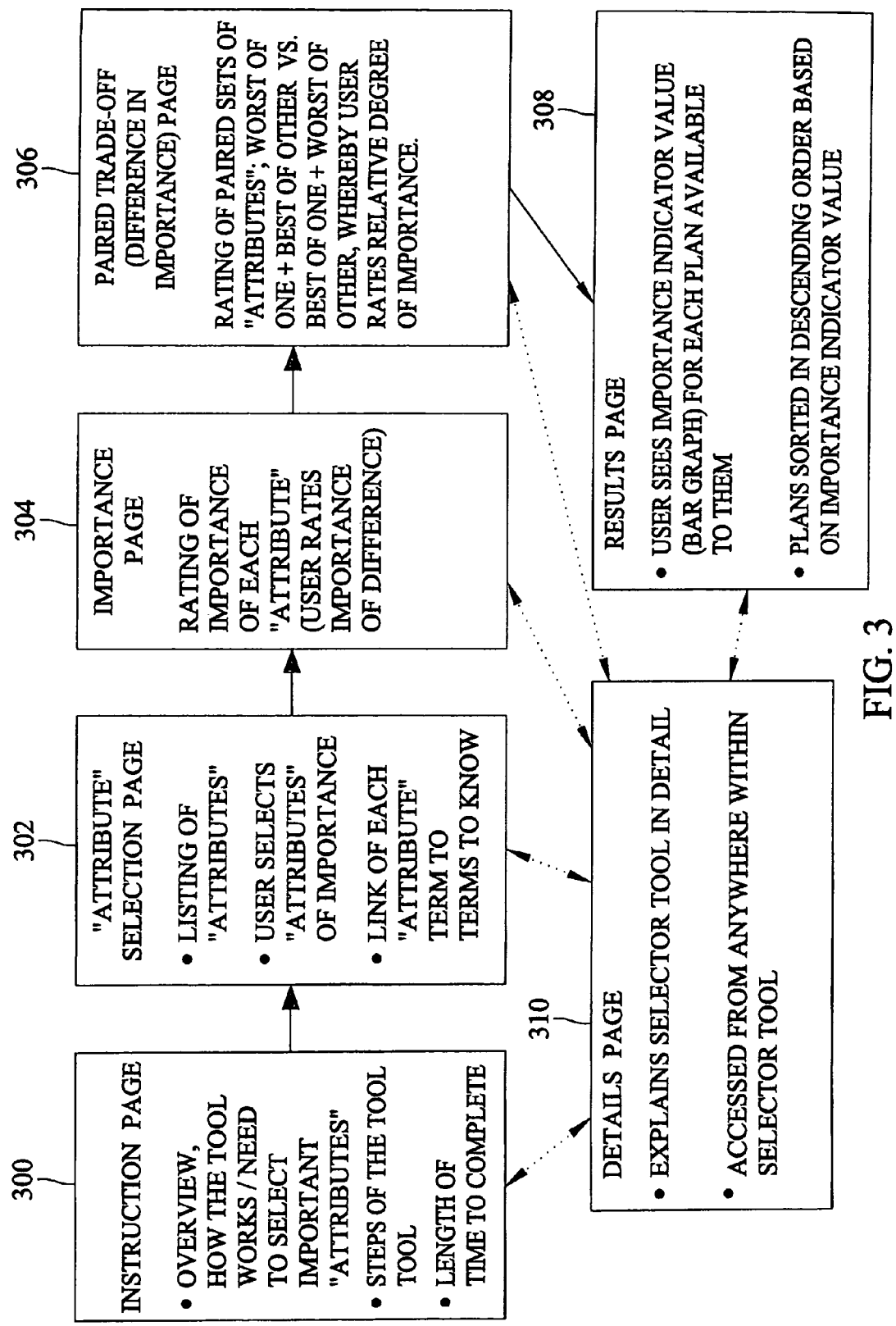
FIG. 3 is a block diagram illustrating exemplary relationships between screens presented to the user by the conjoint analysis application according to an embodiment of the subject matter described herein.

FIG. 3 is a block diagram of exemplary screens that may be presented by user interface generator 200 illustrated in FIG. 2.

In FIG. 3, instruction page 300 provides an overview of how the conjoint analysis application works, steps required to be performed by the user in using the application, and the length of time required to complete the selection. Because instruction page 300 does not provide functionality important to describing the present subject matter, further description relating thereto will not be presented herein.

Figure 4:
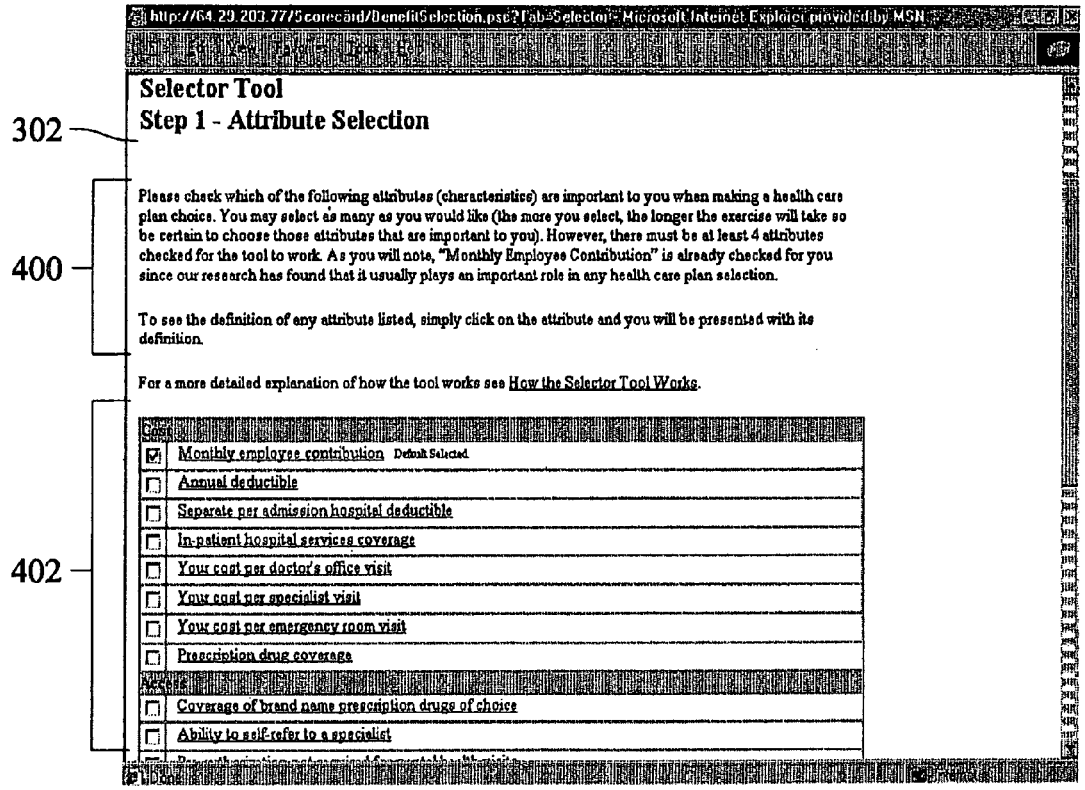
FIG. 4 is a screen shot of attribute selection page 302 illustrated in FIG. 3.

Attribute selection page 302 provides a listing of attributes, allows the user to select attributes that are of importance to the user, and links each attribute to terms to know. FIG. 4 is a screen shot of an exemplary attribute selection page 302. In FIG. 4, attribute selection page 302 includes an instruction portion 400 that provides the user with instructions on how to use attribute selection page 302. In the illustrated example, instruction portion 400 instructs the user that the user must select at least four attributes in order for the tool to work. Attribute selection page 302 also includes an attribute selection portion 402 that allows the user to select attributes that are of importance to the user and that allows the user to access definitions of terms. In the illustrated example, attribute selection portion 402 includes a table containing attribute categories relating to employer-sponsored health plans, such as cost and access. Each attribute category includes a series of attributes. In the illustrated example, the "cost" attribute category includes attributes such as monthly employee contribution, annual deductible, separate per-admission hospital deductible, etc. Similarly, the "access" attribute category includes attributes such as coverage of brand name prescription drugs of choice and the ability to self-refer to a specialist. In order to select an attribute of importance, the user clicks on the appropriate box using an input device, such as a mouse. The attributes selected by the user will be used in calculating the relative utilities of health plans.

Figure 5:
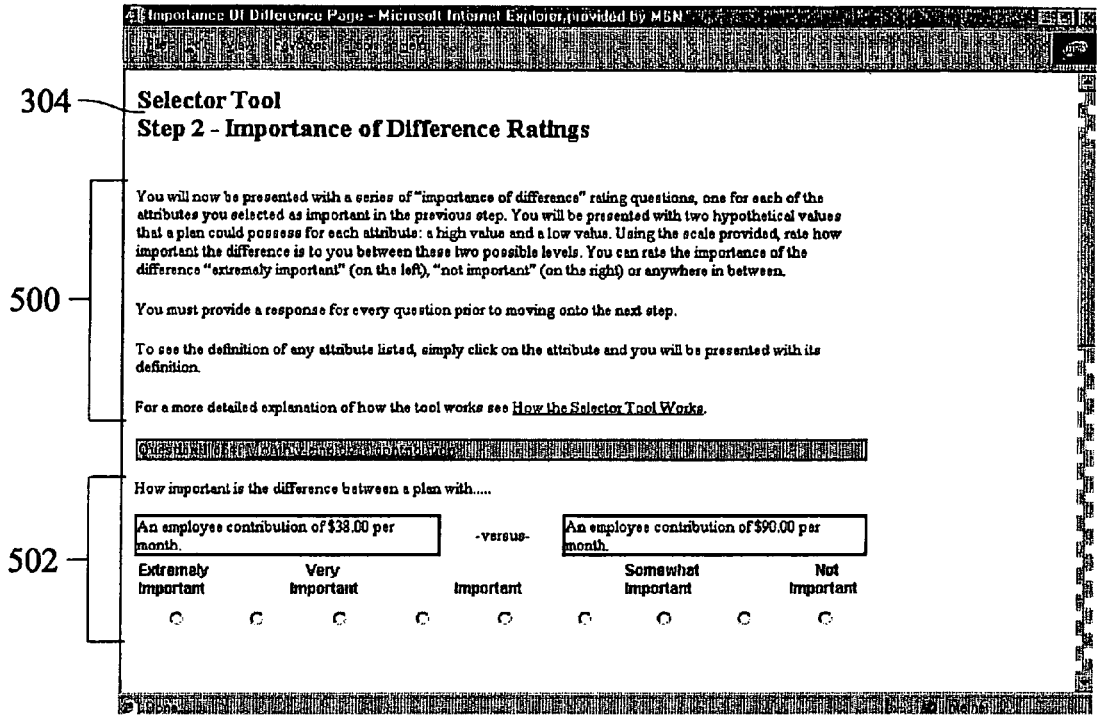
FIG. 5 is a screen shot of importance page 304 illustrated in FIG. 3.

Referring back to FIG. 3, once the user has selected attributes that are of importance to the user, the user is presented with importance page 304, which allows the user to rate the importance of each attribute. FIG. 5 is a screen shot illustrating an exemplary embodiment of importance page 304. In FIG. 5, importance page 304 includes an instructions portion 500 that explains to the user the mechanics of using importance page 304. Importance page 304 also includes an importance of difference portion 502 that presents the user with two hypothetical values that a plan could possess for each attribute: a high value and a low value. A scale is provided that requires the user to rate how important the difference is to the user between the two possible alternatives. In the illustrated example, the attribute being evaluated is monthly employee contribution to a health plan. The user is asked to rate the importance of the difference between a plan with an employee contribution of $38 per month versus a plan with an employee contribution of $90 per month. A scale is provided below the choice that allows the user to rate the degree of importance between the two settings for each variable selected: a best setting and a worst setting. In the illustrated example, the user may indicate that the difference between an employee contribution of $38 per month and an employee contribution of $90 per month is very important. Importance page 304 stores a value indicative of the relative importance of the difference to the user and passes this value to utilities calculation engine 202 (illustrated in FIG. 2).

The user is preferably presented with a series of preference pages 304 that require the user to rate the relative user's preference between best and worst settings of variables relating to an attribute. Once the user has completed the importance of difference rating step, referring back to FIG. 3, the user is presented with a series of paired trade-off pages 306. Each paired trade-off page 306 requires the user to rate paired sets of attributes. In particular, the user is presented with the best setting of one attribute and the worst setting of another attribute versus the worst setting of the first attribute and the best setting of the second attribute and the user is asked to rate the relative degree of importance of the best and worst settings of the different attributes.

Figure 6:
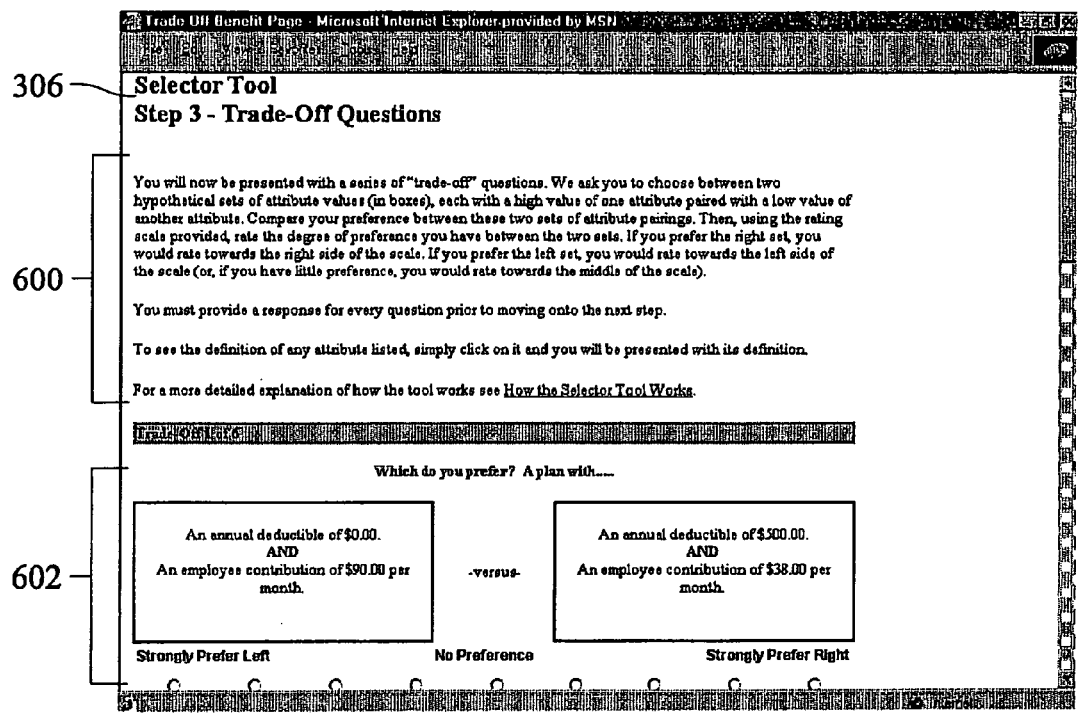
FIG. 6 is a screen shot of paired trade-off page 306 illustrated in FIG. 3.

FIG. 6 illustrates an exemplary paired trade-off page 306 that may be displayed by a conjoint analysis application according to an embodiment of the subject matter described herein. In FIG. 6, paired trade-off page 306 includes instructions portion 600 that instructs the user on how to select between the alternatives presented on page 306. Paired trade-off page 306 also includes a trade-off selection portion 602, which presents the user with two pairings of two different attributes. In a preferred embodiment, the user is presented with a first pairing that includes a highest setting of one attribute and a lowest setting of another attribute and a second pairing that contains the highest setting of one attribute and the lowest setting of another attribute. For example, if the attributes are A1 and A2, the first pairing would be high(A1) AND low(A2), and the second pairing would be low(A1) AND high(A2). In the example illustrated in FIG. 6, the pairings of attributes are as follows: an annual deductible of $0 and an employee contribution of $90 per month versus an annual deductible of $500 and an employee contribution of $38 per month. The pairings represent combinations of high and low settings of the illustrated attributes—monthly contribution and annual deductible. The user is required to rate the user's preference between the pairings using discreet values on the scale provided below the pairings. For example, if the user strongly prefers an annual deductible of $500 and an employee contribution of $38 per month versus an annual deductible of $0 and an employee contribution of $90 per month, the user may select one of the circles on the right side of pair trade-off page 306.

The user is presented with a series of paired trade-off screens 306 and is required to rate the user's preference for each of the pairings. Values indicative of each of the user-selected ratings are provided to utilities calculation engine 202 illustrated in FIG. 2.

Once the user has completed all of the importance pages 304 and paired trade-off pages 306, conjoint analysis application 36A may perform the following steps:
1. Using utilities calculation engine 202, a "final computed importance" is calculated for each "attribute" used in the exercise. This is a measure of the relative importance of the "attribute" with respect to the "settings" of that "attribute" presented as well as to the relative importance of all the other "attributes."
2. Utilities calculation engine 202 gathers the performance levels (actual "settings") for each "alternative" available to the "user," for each "attribute."
3. For each "alternative" and "attribute" utilities calculation engine 202 creates a "setting utility" score for each "alternative" available to the "user." Details of this calculation are described below. The sum of the "setting utility" scores for all the "attributes" for an "alternative" become the "alternative's" "total utility" score. This value is unique to each "alternative"/"user" combination.
4. The "user" is then presented with a list of all the "alternatives" available to them with a graphical representation of the relative "total utility" scores of the "alternatives." With this information, the user can ascertain how well each "alternative" matches their stated importance.

Figure 7:
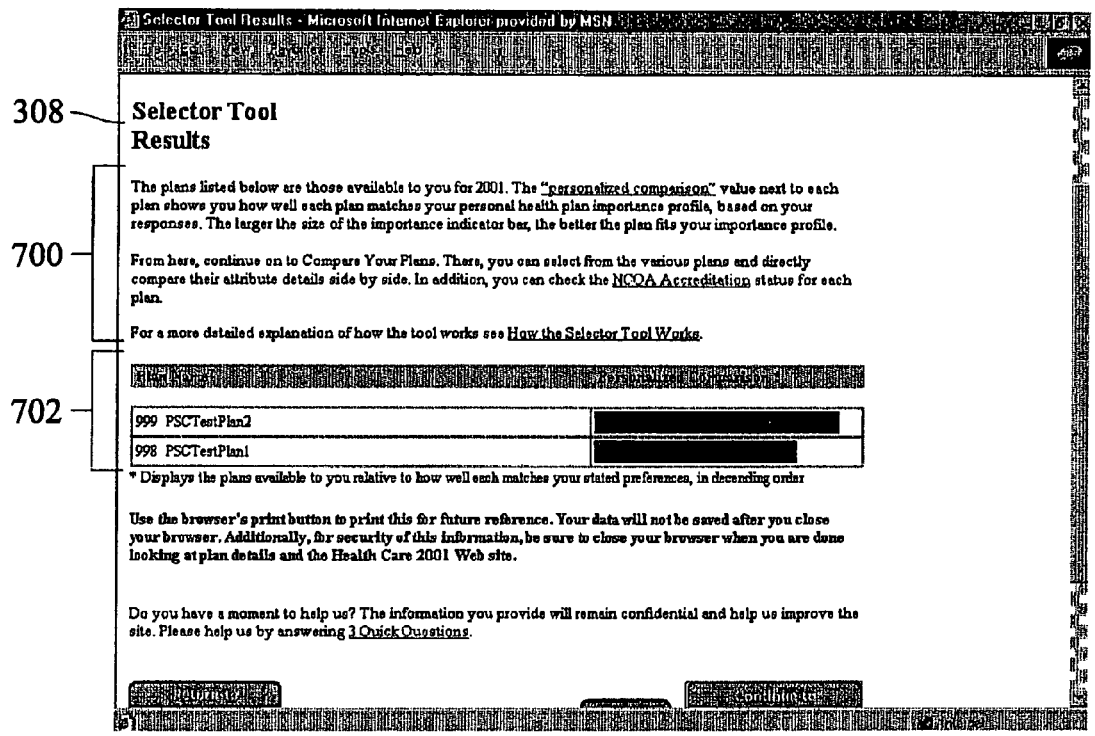
FIG. 7 is a screen shot of results page 308 illustrated in FIG. 3.

Referring back to FIG. 2, results page 308 presents the results from the utilities calculation to the user. The utilities are measured in terms of a preference value that indicates the relative utility of each choice to that particular user. Alternative choices may be sorted in any order, such as descending order. FIG. 7 illustrates an exemplary results page 308 that may be displayed by a conjoint analysis application according to an embodiment of the subject matter described herein. In FIG. 7, results page 308 includes a description portion 700 that describes the contents of results page 308. Importance indicator portion 702 includes a table having a bar graph that graphs the importance indicator value for each of the complex alternatives. In the illustrated example, the bar graph indicates that PSC test plan 2 more closely matches the user's preferences than PSC test plan 1. Accordingly, based on results page 308, the user should select PSC test plan 2 as the user's health plan.

Figure 8:
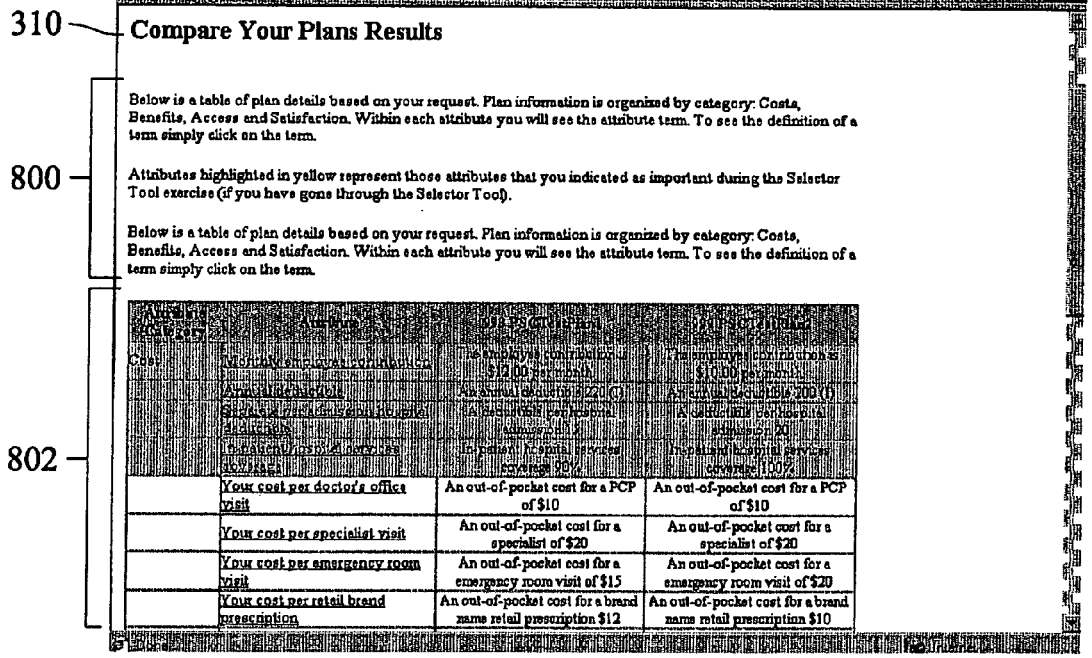
FIG. 8 is a screen shot of details page 310 illustrated in FIG. 3.

Referring back to FIG. 3, a details page 310 can be accessed from any of the other pages 300, 302, 304, 306, and 308. Details page 310 explains the feature of the page from which details page 310 was accessed. For example, if details page 310 is accessed from results page 308, a more comprehensive explanation of the results will be presented. FIG. 8 illustrates an example of details page 310 accessed from results page 308. Referring to FIG. 8, details page 310 includes an explanation portion 800 that explains the content of details page 310. Details page 310 includes a content table 802 that compares the attributes of two choices presented to the user. In the illustrated example, the choices are employer-sponsored health plans. The attributes include features of the health plans, such as annual deductible, employee contribution, and out-of-pocket costs for prescriptions.

Thus, as illustrated above, the subject matter described herein may provide a user-friendly graphical user interface that simplifies complex choices for users. The users are presented with two series of simple choices. Based on the user's responses to the simple choices, a utilities calculation engine according to an aspect of the present subject matter may calculate the relative utility of complex choices for the user. By breaking the complex choices into series of simple choices, the present subject matter may facilitate user interaction with different types of software, such as customer relationship management software, auction software, and search engine software.

Detailed Description of Calculations Performed by Utilities Calculation Engine

The statistical algorithm implemented by utilities calculation engine 202 involves the calculation of "regression" coefficients ($u_k$) for the equation:

$$y_i = \alpha_i + u_1 * a_{1i} + u_2 * a_{2i} + \ldots + u_k * a_{ki} + e_i$$

where $y_i$ is a variable with i possible observations per tool user, representing the quantitative values chosen by a individual to measure his or her judgment of the importance of the difference between some best value of each important "attribute" and some worst value of the "attribute", as well as values input by that individual to measure his degree of attraction to either of two two-"attribute" alternatives (or choices) (in which the key characteristic of those two-"attribute" alternatives is that the first "attribute" has its best possible value while the second has its worst possible value, and the other alternative's two "attributes" have the characteristic that the first "attribute" has its worst possible value while the second "attribute" has its best possible value). It is important to note that while the "user" provides the relative degree to which he/she prefers one "best/worst" "alternative" (i.e. product) to the other, the algorithm for deriving "final estimated importances" (i.e. the regression analysis) interprets these responses as the mathematical difference in the "importances" of the two "attributes." This unique property of the algorithm is so important that the following example is warranted to clearly illustrate the mechanics.

Assume the two "attributes" of a trade-off screen 306 are price and quality and assume the "alternatives" are bicycles. Thus, the trade-off screen might look like the following:

| $500 High Quality | | | | vs. | | | | $100 Low Quality |
|---|---|---|---|---|---|---|---|---|
| −4 | −3 | −2 | −1 | 0 | +1 | +2 | +3 | +4 |

The user is asked to respond with a number between −4 and +4, with a −4 meaning he/she strongly prefers the High Quality, $500 bicycle and a +4 meaning he/she strongly prefers the Low Quality, $100 bicycle. Values between +4 and −4 indicate less strong preferences, with 0 (zero) indicating the user prefers the two bikes equally. Because all "attributes" are studied in the trade-off screens only in terms of their best and worst "settings" and also because exactly two "attributes" are studied in each trade-off screen 306, any value on the +4 to −4 continuum has a second interpretation, besides the relative preference of one "alternative" vs. the other, which is the mathematical difference in the "importance" of the two "attributes" being studied (where the "importance" values are on a +1 to +5 scale). Thus, if a user states a "+3" in the above trade-off, that can be interpreted to mean that price is more "important" than quality and precisely that the "importance" of price is 3 more "importance" points than the "importance" of quality. In other words, the user may have "importance" values for price and quality of +4 and +1 respectively, or +5 and +2 or +4.5 and +1.5 (the actual importance magnitudes are gauged elsewhere (not in the trade-off screens), in the "importance" (i.e. importance of difference) screens. Other trade-off values have similar interpretations (e.g. a "0" is interpreted as the "importance" of price and quality being equal; a "−4" is interpreted as the "importance" of price being 4 "importance" points less than the "importance" of quality (e.g. price "importance"=1 and quality "importance"=5). Another way to view this is that while the user is responding (with respect to moving from −4 to +4) in terms of left-of-screen "alternative" vs. right-of-screen "alternative," the software algorithm interpretation is bottom-of-screen "attribute" vs. top-of-screen "attribute". This property (interpretation) of the algorithm may indeed be the single most unique aspect of utilities calculation engine 202.

The subject matter described herein is not limited to using any particular scale for rating user preferences with regard to difference in importance or trade-offs. The size and increments in the scale depend on the desired granularity and the algorithm used to generate the total utility value.

As described above, two types of data are gathered from users:
1. The importance of a single "attribute" (defined as the importance of the difference between the best and worst "settings" of that "attribute"), measured on a 1-to-5 scale (using importance pages 304).
2. The difference in the importance of two "attributes. Since the "importance" of each "attribute" is measured on a 1-to-5 scale (see 1 above), the "difference in importance" is measured on a −4-to-4 scale (since the minimum value is a 1 minus a 5 which equals −4 and the maximum value is a 5 minus a 1 which equals 4) (using paired trade-off pages 308).

Via regression analysis, both types of data are analyzed together as a single set of information. The result of this regression analysis is a single number for each "attribute" indicating the final estimate of how important the user feels the "attribute" is (on the original "importance" scale).

The data may be coded as follows:

Dependent Variable Vector Y

Type 1 "importance" data is simply bottom-augmented with the type 2 "difference in importance" data. Thus, if a user had been asked about 5 "attributes" and had given "importance" scores of 5, 4, 3, 2, and 1, the Y "importance" data would equal:

5
4
3
2
1

Similarly, if the user had seen 6 pairs of "attributes" and had given "difference in importance" ratings of −4, 3, 0, 1, 0, and −2, the Y "difference in importance" data would equal:

−4
3
0
1
0
−2

Thus, the final Y vector would equal:

5
4
3
2
1
−4
3
0
1
0
−2

The number of rows equals the number of observations of data used in the regression analysis and is equal to the number of separate data values supplied by the user for "importance" and for "difference in importance" questions.

Independent Variable Matrix X

The X matrix associated with Type 1 "importance" data is made of rows that are "dummy" coded with a "1" indicating the "attribute" the user is referring to and 0's otherwise. Thus, assuming the "importance" scores of 5, 4, 3, 2, and 1 given above were in the order of first, second, third, fourth, and fifth "attributes, the X "importance" data would equal:

$$\begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}$$

Note that it is not necessary that the order is first, second, third, fourth, and fifth, however. If the data had been in, say, order of second, first, third, fourth, and fifth attributes, then the X matrix would have looked like:

$$\begin{pmatrix} 0 & 1 & 0 & 0 & 0 \\ 1 & 0 & 0 & 0 & 0 \\ 0 & 0 & 1 & 0 & 0 \\ 0 & 0 & 0 & 1 & 0 \\ 0 & 0 & 0 & 0 & 1 \end{pmatrix}$$

For this example, the former order is assumed.

In addition to determining an X-matrix for the importance data entered through importance pages 304, utilities calculation preferably also determines an X-matrix for difference of importance data collected through paired trade-off screens 306.

The X matrix associated with the "difference of importance" responses is made of rows that are coded as "1" if the "attribute" is one of the pair being traded off and is the "attribute" shown either at the top or the bottom of the screen, "−1" if the "attribute" is one of the pair being traded off and is the "attribute" shown opposite the other "attribute" (at bottom if former is at top of screen and vice versa), and "0" if the "attribute" is not one of the pair being traded off. For example, assuming that the "top-bottom" pairs of "attributes" are first-second, second-third, third-fourth, fourth-fifth, fifth-first, and fourth-second, and the top "attribute" has its best "setting" on the right side of the screen and bottom "attribute" has its best "setting" on the left side of the screen (though this may be interchanged), the X matrix associated with the "difference of importance" data equals $$\begin{pmatrix} 1 & -1 & 0 & 0 & 0 \\ 0 & 1 & -1 & 0 & 0 \\ 0 & 0 & 1 & -1 & 0 \\ 0 & 0 & 0 & 1 & -1 \\ -1 & 0 & 0 & 0 & 1 \\ 0 & -1 & 0 & 1 & 0 \end{pmatrix}$$

The above X matrix is given only as an example. Pairings of "attributes" may be random or a systematic approach may be used to pair the attributes, as in an orthogonal or near-orthogonal design.

As before with the Y vector, the final X matrix is created by bottom-augmenting the "importance" data with the "difference in importance" data. Thus the final X matrix equals $$\begin{pmatrix} 1 & 0 & 0 & 0 & 0 \\ 0 & 0 & 0 & 0 & 0 \\ 0 & 1 & 0 & 0 & 0 \\ 0 & 0 & 1 & 0 & 0 \\ 0 & 0 & 0 & 1 & 0 \\ 1 & -1 & 0 & 0 & 0 \\ 0 & 1 & -1 & 0 & 0 \\ 0 & 0 & 1 & -1 & 0 \\ 0 & 0 & 0 & 1 & -1 \\ -1 & 0 & 0 & 0 & 1 \\ 0 & -1 & 0 & 1 & 0 \end{pmatrix}$$

Thus, the final set of data to be analyzed is as follows:

| Y vector | X matrix |
|---|---|
| 5 | 1 0 0 0 0 |
| 4 | 0 1 0 0 0 |
| 3 | 0 0 1 0 0 |
| 2 | 0 0 0 1 0 |
| 1 | 0 0 0 0 1 |
| −4 | 1 −1 0 0 0 |
| 3 | 0 1 −1 0 0 |
| 0 | 0 0 1 −1 0 |
| 1 | 0 0 0 1 −1 |
| 0 | −1 0 0 0 1 |
| −2 | 0 −1 0 1 0 |

In summary, each row (of both the Y vector and the X matrix) represents a single response the "user" has given, the actual response being recorded in the Y vector. Each column of the X matrix represents an "attribute" the "user" has chosen as important (where rows with only 1's and 0's have a 1 in the column of the "attribute" that is the subject of the "importance"-of-difference screen and rows with 1's, 0's, and −1's have a 1 or −1 in a column to identify which attribute was at the top of and which attribute was at the bottom of the trade-off screen.

From this type data set, the B regression coefficients are calculated Via $$B = (X'X)^{-1} X'Y,$$

where $^{-1}$ indicates the matrix inversion transformation and the single quote (') indicates the matrix transpose transformation, are directly interpretable as importance (on the 1-to-5 "importance" scale) scores for the "attributes" they modify. Each B coefficient is paired with and thus modifies one "attribute." A slight variation of this form is to include an additional column of ones ("1"s) in the leftmost position of the X matrix. The extra B coefficient in that instance is not associated with an "attribute" but is a measure of the intercept of the regression model, which theoretically equals zero. That is, in the absence of predicting anything about importance (e.g. an "importance" by plugging in a "1" or a "difference in importance" by plugging in a "1" and a "−1"), that is, only a series of zeros are plugged in, the model predicts zero. That is to say that the null condition of using the model to do nothing "predicts" a "0" (zero) "importance."

Each user chooses which m or more "attributes" he/she actually uses in making a selection, where m is a variable threshold and is set in advance. If this number exceeds n then the top n (based on the user's "importance" scores (and pre-determined expert judgments of the importance of "attributes" if a tie-breaker is needed)) are used and it is only these that have "final computed importances" calculated via the above formula. Again, n is a variable threshold that is set in advance. For excluded "attributes", the "final computed importance" is set to zero. Thus, the number of "attributes" for which "final computed importances" are calculated varies from user to user. One exemplary implementation of the subject matter described herein allows for "importance" scores to be calculated for anywhere from four to fifteen "attributes" (that is, m=4 and n=15).

While it would be sufficient to simply use the (direct) "importance" scores for each "attribute" to help users select products/services, it is believed that the augmented data, the "difference in importance" data, greatly improves "final computed importances" and thus recommendation results. This is so because users are not actually told they are providing "difference in importance or trade-off" scores, but rather are told to gauge their preference for the best "setting" of one "attribute" paired with the worst of the other versus the worst "setting" of the one "attribute" paired with the best of the other. In this way, the user is actually comparing two products or services. Because only the best and worst "settings" are ever shown and because only two "attributes" are shown at a time, the interpretation of the responses is precisely "the mathematical difference in the importance of the two 'attributes' (each on a 1-to-5 scale)." This indirect way of obtaining information on the relative impact importance of "attributes" by comparing a series of hypothetical "alternatives" is a more realistic task for the "user" and is believed to enhance relative importance measurement.

With "final computed importances" estimated/calculated, the algorithm moves to using that data to calculate "total utility" scores for each product, service, or other selection for which the conjoint analysis is being performed. For each "attribute", the "final computed importance" (i.e. the B coefficient from the "attribute") is taken as the value of the worst "setting" of the "attribute" and five times the "final computed importance" is taken to be the value of the best "setting" of the "attribute". Then, using linear interpolation, the "setting" or specification of each product, service, or other selection is transformed to a value to be presented to the user. For example, if the "final computed importance" of price is 3.2 and the worst price "setting" is $50, and the best price "setting" is $10, then a product with a price of $23.33 would have a "setting utility" for price of $$3.2+(5*3.2-3.2)*((23.33-50)/(10-50))=11.7344.$$

The utility numbers are "unitless." That is; 10.6656 is not 10.6656 dollars or anything else. They are relative numbers that allow for comparing specifications on different "attributes" for a given user. A "setting" on an "attribute" that has a "10" value for user is worth more than a "setting" on the same or another "attribute" that has a value of, say, "7." Individual "attribute" values are summed across the "attributes" making up the products or services, yielding a "total utility" score for each product or service for each user.

Utilities calculation engine 202 then rank orders the products, services, or other selections for the user, in descending order of "total utility." The top product, service, or other selection in this list is the best recommendation for the product, service, or other selection the user should choose, given the relative importance the user places on the various "attributes" that make up the products or services and the actual specifications of the products or services.

In an application where conjoint analysis output is used to drive another application, utility settings for the individual attributes of a product, service, or other application may be the output that is presented to the application, rather than the total utility value. For example, in an application where conjoint analysis is used to determine relative utilities of search keywords to be input to a search engine, the keywords and their relative utilities may be input to the search application. The step of computing the final importance values may be omitted. Alternatively, the step of computing the final importance values may be implemented after the search is performed using the weighted keywords to rate the search results.

Although the subject matter described herein can be used to calculate relative total utilities of products or services based on any number of attributes and attribute pairings, the following examples illustrate exemplary numbers of attributes and corresponding attribute pairings suitable for use with embodiments of the subject matter described herein.

(1) 4 "attribute" engine

| Pairs | Interpretation |
|---|---|
| 1, 4 | This array of paired integers describes the comparisons |
| 2, 3 | of combinations of "attributes" made by utilities |
| 3, 4 | calculation engine 202. The pairings listed here are for 4 |
| 4, 2 | attributes and are believed to be unique. The remaining |
| 3, 1 | pairings listed herein are for 5 to 15 attributes and are |
| 1, 2 | also believed to be unique. |

(2) 5 "attribute" engine 1, 2
2, 4
5, 3
3, 1
1, 4
3, 4
1, 5
5, 2

(3) 6 "attribute" engine 1, 2
2, 4
5, 3
3, 1
6, 4
1, 6
3, 4
2, 5

(4) 7 "attribute" engine 1, 2
2, 4
5, 2
6, 7
3, 1
7, 3
1, 6
3, 4
4, 5

(5) 8 "attribute" engine 1, 2
5, 8
2, 4
5, 2
6, 7
3, 1
7, 3
1, 6
3, 4
8, 6
4, 5

(6) 9 "attribute" engine 1, 2
9, 7
2, 4
7, 3
4, 5
6, 1

| Pairs | Interpretation |
|---|---|
| | 5, 2 |
| | 8, 6 |
| | 3, 1 |
| | 8, 9 |
| | 4, 3 |
| | (7) 10 "attribute" engine |
| | 1, 2 |
| | 9, 7 |
| | 2, 4 |
| | 7, 3 |
| | 4, 5 |
| | 10, 9 |
| | 6, 1 |
| | 5, 2 |
| | 4, 3 |
| | 8, 6 |
| | 3, 1 |
| | 8, 10 |
| | (8) 11 "attribute" engine |
| | 1, 2 |
| | 9, 7 |
| | 2, 4 |
| | 7, 3 |
| | 4, 5 |
| | 10, 11 |
| | 6, 1 |
| | 5, 2 |
| | 4, 3 |
| | 11, 9 |
| | 8, 6 |
| | 3, 1 |
| | 8, 10 |
| | (9) 12 "attribute" engine |
| | 1, 2 |
| | 9, 7 |
| | 2, 4 |
| | 10, 12 |
| | 7, 3 |
| | 4, 5 |
| | 12, 11 |
| | 6, 1 |
| | 5, 2 |
| | 11, 9 |
| | 4, 3 |
| | 8, 6 |
| | 3, 1 |
| | 8, 10 |
| | (10) 13 "attribute" engine |
| | 11, 13 |
| | 1, 2 |
| | 9, 7 |
| | 2, 4 |
| | 10, 12 |
| | 7, 3 |
| | 4, 5 |
| | 12, 11 |
| | 6, 1 |
| | 5, 2 |
| | 11, 9 |
| | 4, 3 |
| | 8, 6 |
| | 3, 1 |
| | 8, 10 |
| | 13, 9 |
| | (11) 14 "attribute" engine |
| | 11, 13 |
| | 1, 2 |
| | 9, 7 |
| | 2, 4 |
| | 10, 12 |
| | 7, 3 |
| | 4, 5 |
| | 12, 11 |
| | 6, 1 |
| | 5, 2 |
| | 14, 12 |
| | 11, 9 |
| | 4, 3 |
| | 10, 14 |
| | 8, 6 |
| | 3, 1 |
| | 8, 10 |
| | 13, 9 |
| | (11) 15 "attribute" engine |
| | 11, 13 |
| | 1, 2 |
| | 8, 15 |
| | 9, 7 |
| | 2, 3 |
| | 10, 12 |
| | 7, 3 |
| | 4, 5 |
| | 12, 11 |
| | 6, 1 |
| | 5, 2 |
| | 14, 12 |
| | 11, 10 |
| | 4, 3 |
| | 10, 14 |
| | 8, 6 |
| | 15, 14 |
| | 3, 1 |
| | 8, 10 |
| | 13, 9 |

In all the above, the numbers in the pairs (e.g. "13,9") signify the two attributes in terms of the rank order of their "importance" ratings by the user. For instance, "13,9" signifies the 13$^{th}$ most important attribute and the 9$^{th}$ most important attribute.

Criteria Matching Heuristic

According to another aspect, the subject matter described herein includes a criteria-matching heuristic for determining alternatives available to a user based on information received from the user.

One of the critical issues in applying a decision tool to the selection of an "alternative" is ensuring the "user" is presented with those "alternatives" that are available to him/her in the marketplace. Especially within the realm of health care plan choice, plans are often times available only based on specific, and sometimes complicated criteria (zip code, employment status, etc). In addition, not only does the "user" need to be "matched" to those product "alternatives" available to them, but they must also be presented with the "attributes" and "attribute settings" that apply to them. For example, "users" looking for health plan coverage for a family will need to see a different set of premiums than do users looking for self-coverage. These two pre-requisites, match users to the appropriate "alternatives" and "attribute settings," are critical to the goal of providing the "user" with an accurate and useful end product.

The subject matter described herein, in attempting to solve these requirements, includes a criteria-matching solution. This solution relies on a data driven mechanism that automates and "genericizes" the process of matching "users" to "alternatives" and "attribute/attribute settings," regardless of the "alternative" category and "attributes" involved. One exemplary criteria matching system works as follows:

1) Specific criteria, which may be used to link a "user" to an "alternative" or "attribute," are created. This could include such things as "single" or "family" or "full time," etc. These criteria are populated in a database table.
2) The "attributes" to be used in the project are also populated in a separate database table.
3) A "join" table is created that links which criteria apply to each of the "alternatives."
4) An "alternative" can have multiple criteria associated with it, while a criterion can be associated with multiple "alternatives."
5) The "alternatives" to be used in the project are populated in a separate database table.
6) A "join" table is created that links the criteria that apply to each of the "attributes."
7) An "alternative" can have multiple criteria associated with it, while criteria can be associated with multiple "attributes."

Part of the conjoint analysis application described above is the "registration." This is the initial step that requires the user to input criteria determining questions, such as "What is your zip code," etc. These registration questions are also data driven—that is, the questions and the responses are drawn from one data table and are written to another data table. The answers to these registration questions are linked, via another join table, to the criteria that have been established for the project.

Once the user answers registration questions, the responses trigger a look up of which criteria apply to the user. Using this criteria and the criteria-"alternative" and criteria-"attribute" join tables, the user is automatically matched with the "alternatives" and "attributes" that are applicable to them. One example would be the question, "are you a member of any of the following unions? APWU, Mailhandlers or Postal Workers. If the user answers "yes," and selects APWU, then the application would only match the user's preferences to plans which are available to members of this union and with the benefit structure of that plan which is only available to members of that union. Another example might be a user's answer to the questions, 1) what is your age, and 2) are you eligible for Medicare? Again, if the user answers "Yes," the user will only be shown plans to which that user is eligible and at the rates that are applicable to person's eligible for Medicare.

This structure has been developed so that it is "alternative"-category and "attribute" in-specific; it is a highly flexible methodology for meeting the purpose of joining users to "alternatives" and "attributes."

Criteria Matching Heuristic Example

The following is an abbreviated example of how the criteria matching heuristic works for a health plan selection tool. The functionality illustrated by the example may also be applied to embodiments that combine conjoint analysis with customer relationship management software, auction software, or search engine software. In this example, the following assumptions are made:
There are 2 types of employees, Union 1 and Union 2.
For any given plan, premium varies by coverage level as well as the union to which the employee belongs.
Employees can choose from 2 types of coverage levels—individual coverage and family coverage.
There are 6 possible health plans:
2 available in NY zip codes (Plan A, Plan B)
2 available in NJ (Plan C, Plan D)
1 available nationally (Plan E)
1 available regardless of coverage area, but the employee must belong to Union 1 (Plan F)

The following questions can be presented to each employee through a graphical user interface:
Question 1: What Union do you belong to?
 1. Union 1
 2. Union 2
Question 2: What type of coverage level are you looking for?
 1. Individual
 2. Family
Question 3: What is your zip code?

The following tables are used by conjoint analysis application 36A to match users with attributes and products. Each of these tables may be stored in a computer-readable medium, such as a memory device.

TABLE 1

Criteria - Defines the criteria needed for the project to match users with attributes and products (such as health plans). Note the ZipCodeExclusive flag may be used to prevent certain user groups from being matched to products based on coverage area (zip code) if need. The ZipCodeExclusive flag is not used in this example.

| Criteria_ID | Description | CriteriaType | ZipCodeExclusive |
|---|---|---|---|
| 1 | All Users | Ubiquitous | N |
| 2 | Union 1 | Ubiquitous | N |
| 3 | Union 2 | Ubiquitous | N |
| 4 | Union 1, Individual | Attribute | N |
| 5 | Union 1, Family | Attribute | N |
| 6 | Union 2, Individual | Attribute | N |
| 7 | Union 2, Family | Attribute | N |
| 8 | Individual | Attribute | N |
| 9 | Family | Attribute | N |

TABLE 2

ProductCriteria - Defines which plans are matched via criteria. There are two steps to matching users to products (plans). Step one is by association with criteria. Step two is by zip code coverage.

| Criteria_ID | Product_ID |
|---|---|
| 2 | 6 |

TABLE 3

ProductAttribute - Defines the attributes for a project

| ProductAttribute_ID | Description |
|---|---|
| 1 | Premium |
| 2 | Annual Deductible |
| 3 | Chiropractic |

TABLE 4

Product - Defines the products (such as health plans) for a project

| ProductAttribute_ID | Description |
|---|---|
| 1 | Plan A |
| 2 | Plan B |
| 3 | Plan C |

TABLE 4-continued

Product - Defines the products (such as health plans) for a project

| ProductAttribute_ID | Description |
| --- | --- |
| 4 | Plan D |
| 5 | Plan E |
| 6 | Plan F |

TABLE 5

AttributeOption - Defines the possible variants of attributes for a project. For example, while there is one attribute "annual deductible," there are 2 sets of values for each plan - the individual value and the family value. Depending on the desired coverage level, users should be matched to the appropriate plan values.

| ProductAttribute_ID | Criteria_ID | Description |
| --- | --- | --- |
| 1 | 4 | Premium, Union 1, Individual |
| 1 | 6 | Premium, Union 2, Individual |
| 1 | 5 | Premium, Union 1, Family |
| 1 | 7 | Premium, Union 2, Family |
| 2 | 8 | Annual Deductible, Individual |
| 2 | 9 | Annual Deductible, Family |
| 3 | 1 | Chiropractic |

TABLE 6

ProductCoverage - Associates Products with zip codes. In Table 6, the zip codes have been abbreviated as "new york zips" and "new jersey zips" for purposes of this example. In a real project, for each product, a record would exist for each zip code associated with the product.

| Zipcode | Product_ID |
| --- | --- |
| (New Jersey zips) | 1 |
| (New Jersey zips) | 2 |
| (New York zips) | 3 |
| (New York zips) | 4 |
| (both New York and New Jersey zips) | 5 |

Steps for Performing Criteria Matching Heuristic

1. The user is asked to answer the registration questions. Depending on how the user answers the questions, criteria are associated with each user type.
2. Once users are associated with criteria, joins are done to determine which products are available to the user. This is a 2-step process. In step 1, users are matched with plans that are only associated by criteria (not coverage area (zip code)). The ProductCriteria table (Table 2) is used for this purpose.
In step 2 users are matched to products by coverage area (zip code). The ProductCoverage table (Table 6) is used for this purpose.
3. In addition, to joining the user with products, users are also matched to their appropriate attributes; that is, the attributes that are available and pertinent to their decision, based on the registration questions.
4. Once these joins have been done, the user can proceed with using the tool.

Sample Answers and Results

1. The user answers Q1 "Union 1," Q2 "individual" and Q3 as a New Jersey zip code.
2. 4 criteria are associated with the user: 1, 2, 4 and 8
3. Step 1 of matching the user with the products available to the user is to see if any of the user's criteria meet the ProductCriteria conditions.
In this case, the user would be eligible for product_id 6 (Plan F) since the user's criteria of 2 matches a record in the ProductCriteria table (Table 2).
4. Step 2 of matching the user with the products available to the user is to see which plans, if any, are available to the user due to the user's zip code. In this case product_ids 1 (Plan A), 2 (Plan B) and 4 (Plan E) would be available to the user based on the zip code that the user entered.
5. Now the user is matched with attributes. Given the user's criteria, the user would be matched with the ProductAttribute_id/Criteria_id combinations of 1,4 (Premium, Union 1, Individual) 2, 8 (Annual deductible, Individual) and 3, 1 (Chiropractic, all users). With this identified, the tool can ensure the user trades off between the relevant attributes, and that the attribute values used for each plan are appropriate for the user.

Scalability, Adaptability, and Efficiency

Figure 9:
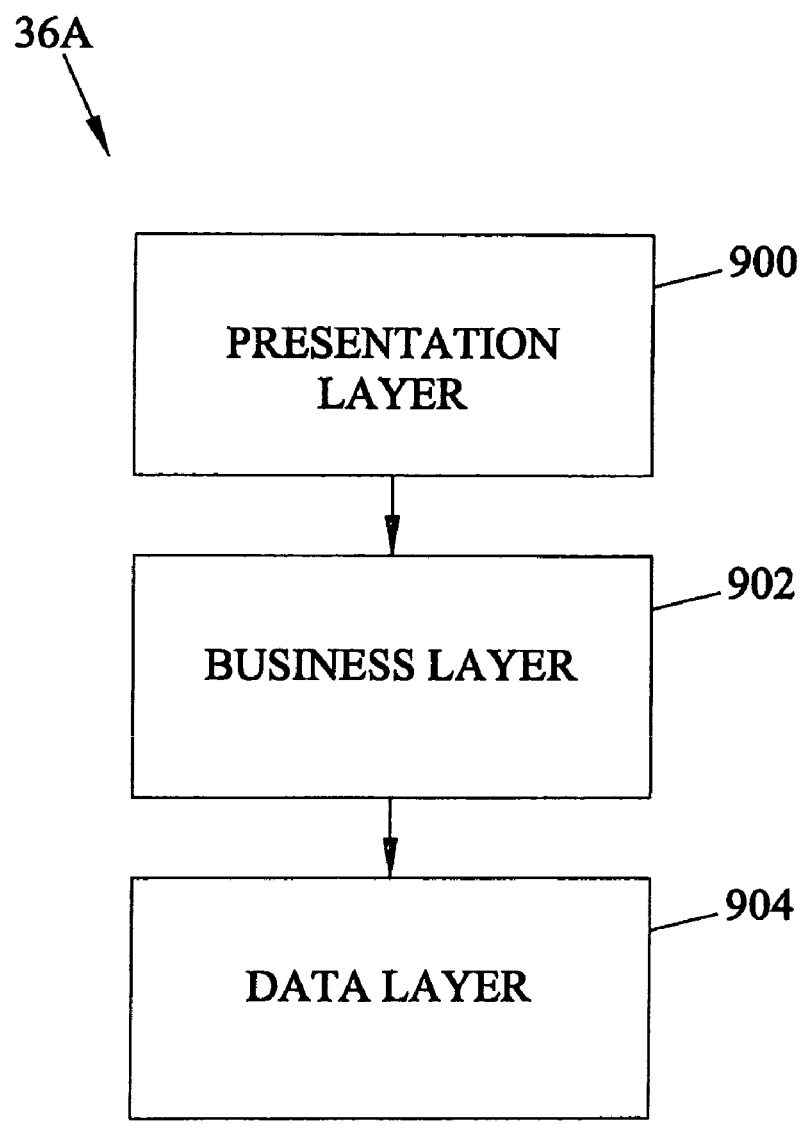
FIG. 9 is a block diagram of a layered conjoint analysis application suitable for use with embodiments of the subject matter described herein.

Another aspect of the subject matter described herein is its scalability and ability to adapt to different applications. FIG. 9 shown below is a block diagram of a preferred embodiment of a conjoint analysis application according to the present invention. In FIG. 9, conjoint analysis application 36A includes presentation layer 900, business layer 902, and data layer 904. Presentation layer 900 contains functions for presenting text and graphics to the user. Business layer 902 includes components, which are separately compiled from application layer code, and extract and store data in data layer 904. Data Layer 904 stores data, such as attributes and available products, services, or other selections, for a given application.

Presentation layer 900 may be written in any suitable presentation layer language, such as Microsoft Active Server Pages (ASP). Microsoft ASP is a script-based language that uses HTML for presentation. The subject matter described herein is not limited to using Microsoft ASP. Other languages that could be used include JSP—a Java-based language, or Cold Fusion. Presentation layer 900 is written to handle any client and any complex decision. Components that change from one application to another are data driven. For example, in order to modify conjoint analysis application 36A for use with a new application, it is not necessary to modify the code that creates the various graphical user interfaces. It is only necessary to modify data that changes from one application to the next, which is stored in data layer 904. For example to change from a health plan selector tool to a 401(k) selector tool, it is only necessary to change the attributes and the available plans in data layer 904.

According to another aspect of the subject matter described herein, conjoint analysis application 36A runs session-less. For example, when the user changes from one screen to the next, server identification of the user was previously accomplished using a session-level variable. Currently, a temporary cookie is created in the user's browser when a user first accesses the tool. The cookie holds a unique identifier to identify the user as the user changes from page to page.

According to yet another aspect of the subject matter described herein, no database calls done through presentation layer 900. All calls to the database are done via components, which are part of business layer 902. Using components to access data greatly reduces overhead. As discussed above, a component is a separately compiled piece of code with a dedicated function, such as "get product IDs available for this user." These components are called by presentation layer 900 when the function is needed. For example, for the attribute selection page, an attribute selection component extracts the attributes that are available for a specific user. Another component present in business layer 902 is the utilities calculation engine, which is described in detail above.

According to another aspect of the subject matter described herein, content, such as instructions for using the tool and other material displayable by the conjoint analysis server, is preferably located in a content database in data layer 904. Storing the content in a content database allows content to be quickly altered and customized for new clients or changing client needs. Data layer 904 may be implemented using any suitable database language, such as Microsoft Structured Query Language (SQL) Server.

According to yet another aspect of the subject matter described herein, the underlying data schema may be created to be flexible and "generic." As used herein, the phrase "data schema" refers to the data structures and databases in data layer 904 used to generate the attributes and questions presented to the user. Rather than product or company-specific data structures, data structures can be generic. For example, rather that having a data structure created around the specific functional needs and specificities of a single client/product (i.e., health plans available to XYZ Corporation), a generic data schema may be developed that accommodates the data needs of the application regardless of the client and or product category. As a result providing generic data structures, the conjoint analysis application can be used for multiple clients and among multiple product categories, with little if any changes to the data schema.

According to another aspect of the subject matter described herein, all frequently used query objects may be indexed. A query object is a field in a database in data layer 904 that the conjoint analysis application might access. Indexing allows faster access to frequently accessed data.

As a result of the features listed above and factors relating to efficient coding, the conjoint analysis application is capable of meeting the needs of multiple clients simultaneously.

Combining Customer Relationship Management Software with Conjoint Analysis

As described above, the methods and systems described herein facilitate user choices among complex alternatives using conjoint analysis. In an alternate implementation, the method and systems described herein can be used in combination with CRM software to even further facilitate user choices among complex alternatives. For example, conjoint analysis may be used in combination with customer relationship management software for matching the needs of buyers and sellers of any product or service. The communication between the purchasers and sellers of these products or services may also be automated. CRM software and conjoint analysis software may automatically determine the most appropriate content for any communication between these parties. In doing so, the customer relationship management and the conjoint analysis software enhance the relationship between the buyers and the sellers and increases the likelihood of a completed transaction between these parties. As with the adaptive conjoint software, customer relationship management software can be employed whenever there are individuals or businesses that benefit from a more responsive interaction between buyers and sellers or goods or services.

Decision theory understands that all people are often attempting to find the best match between alternative options. Whether attempting to purchase an automobile, a house, a computer, a business, or to identify highly compatible individuals for dating and marrying; these decisions are complex and difficult. Using preference profiling as described above, individuals can identify attributes of a given product, service, or other selection, rate those attributes and then make trade-off decisions between pairs of those attributes. The profile, mapped against a database of products, can help consumers identify products or services, which best match their profile. It is intuitive, relatively easy to perform the tasks, and the results can make consumers more comfortable with their decisions.

In an extension to this technique, preference profiling can be improved by combining the technique with customer relationship management software. While the preference profiling allows an individual to list attributes and make trade-offs, it does not facilitate interaction between the buyer and the seller. Adding customer relationship management software to the results of the adaptive conjoint exercise will enhance this relationship. This process can be significantly enhanced by combining the results of the customer relationship management software's profile of the customer, client or prospects, including their stated or assumed desires for mode of communication, timing of communication and other factors which work to better meet the needs of the customer, client or prospect.

It is believed that combining these processes will significantly improve the chances that the choices, selections and matches that result from this exercise will result in a more satisfied customer and more completed transactions between parties. Thus relationships will be more satisfying, mutually beneficial and longer-lasting.

Any suitable customer relationship management software application may be used in combination with conjoint analysis to facilitate user choices among complex alternatives. For example, there are a wide array of customer relationship management software used by businesses, sales and marketing people, human resource personnel and any persons or organizations which work to maintain and build long-lasting relationships with their constituents. There are many companies through the world which offer customer relationship management software and it is believed that nearly all, if not virtually all, of these applications could be combined with the adaptive conjoint application. As an example, a company called Saleforce.com is perhaps the largest customer relationship management company on the Internet. Microsoft Corporation sells Outlook and Outlook Express which are limited customer relationship management software applications. In the real estate marketplace, a company called Top Producer offers sophisticated customer relationship management software. On a small scale, an emerging company called MyBode, Inc., has developed simple customer relationship management software designed to interact with the conjoint software. Other examples of customer relationship management software are nationally known products, such as ACT and Lotus Notes.

CRM software is designed to enable organizations to better serve their customers through the introduction of reliable processes and procedures for interacting with those customers. Often, a successful CRM strategy cannot be implemented by only installing and integrating a software package designed to support CRM processes. Software, combined with business processes is essential for a successful CRM program. Major areas of CRM focus on service automated processes, personal information gathering and processing, and self-service. It attempts to integrate and automate the various customer serving processes within a company. It is believed that CRM processes can be significantly enhanced through the design of software that automates information gathering and dissemination between the customer or client and the company offering goods or services.

As an example, with MyBode's customer relationship management software, employed in the real estate industry, real estate agents invite their customers and prospective home buyers (leads) to personally use the conjoint search software to identify which attributes of a home are most important and the map this preference profile to a list of available homes in a particular market (usually supplied by a "multiple listing service" company). The results of this advanced home search is a list of suitable and available houses, shown in priority order, from best-fit to least best-fit. This is very helpful to the consumer, but equally important is the fact that the combination of the conjoint advanced search software and customer relationship software allows the sponsoring agent to see the preference profile, see the individual's search results and automate interaction with the client or lead based upon that information. Rather than sending hundreds of home listings to their client based upon traditional "flat filter software," the agent is automatically able to send highly specific information to the agent's clients, showing them only homes that fit, for instance, in their "top ten" best fit homes. The result is a very specific interaction between agent and client, which reduces the number of homes shown, makes the buying experience more efficient and much more satisfying to both agent and client. The specificity of the interaction between agent and client is not possible with traditional search software.

Any of the customer relationship management software applications listed above may be used, depending on the specific decision being made (e.g. dating, recruiting, house purchase, car purchase, etc.).

After using the adaptive conjoint exercise, the results may be mapped to the customer relationship management software application in at least two ways: 1) some or all of the results may be used to determine which products or services will be displayed to the client, customer or prospect; and 2) some or all of the customer relationship management software application information can be used to tailor the most appropriate content of message or communication to the customer, client or prospect.

Customer relationship management software operates based upon a combination of inputs from the parties representing the selling side of a transaction and information provided by the person or parties representing the buying side of the transaction. In the case of software which combines inputs and directions from the sellers and inputs and feedback from prospective buyers, the use of conjoint software greatly enhances the specificity of information provided to the system. Inputs to the system based upon highly specific conjoint testing results allow the selling-side parties to very clearly understand the preferences and needs of the buyers, while it simultaneously assists the buyers in more fully understanding their own preferences. The result is a customer relationship management system which is based upon a more complete understanding of the customer's preferences, needs and desires. This understanding then translates into greatly increased relevancy in the communications between selling agent and prospective buyer. With increased understanding between buyer and seller, the likelihood of a closed transaction (purchase) is greatly enhanced. The consumer is well served and more highly satisfied with their purchase and the purchase experience, and the selling agent is significantly more efficient in their selling efforts.

The following table illustrates exemplary functions that may be performed by CRM software and conjoint analysis software in a system that uses conjoint analysis to facilitate user interaction with CRM software.

TABLE 7

CRM and Conjoint

| CRM Software | Conjoint Software |
|---|---|
| Client Contact Information | Preference data by product category |
| Client demographics | Search results in priority order |
| Client Shopping History | Personal favorites saved and commented |
| Client Purchase History | |
| Communications History and Settings | Alerts and Updates on best fit items |
| Personal meetings | Data analysis on preferences for individuals |
| Emails | Data analysis on preferences |
| Telephone log | |
| Letters and mailings | |
| Proposals | |

In one exemplary implementation, the CRM software manages the communications, while the conjoint software feeds highly specific preference profiling information to the CRM system, which allows highly specific communication between the seller of good and services and the buyer of those goods and services.

In addition, conjoint analysis of preference data across demographic groups will be able to identify what types of communication are most effective in moving purchases through the closing of a purchase decision.

The conjoint personal preference data is far more specific than traditional survey data inputs. It forces individuals to make trade-offs between items that have already been selected as items of high interest. Analyzing this data for the individual, and in groups or cohorts of people from similar demographic backgrounds may result in a much deeper level of understanding of the customer and more specific and effective communications between the seller and the buyer.

The CRM software has the capability of using this highly specific preference profiling data to tailor more highly targeted communications between seller and buyer, which results in more effective communication between the seller and the buyer.

The communication of results of choices made using conjoint analysis and customer relationship management software in combination may be better than the results of choices made without the benefit of either of these tools and better than the results of choices made using either of these tools individually. The combination of an intellectual, thinking process (attribute selection and trade-off exercises) and better communication between buyer and seller through customer relationship management software provides a much richer profiling result and selections and matches which are much more likely to be successful. It also likely results in a considerably more satisfying relationship between the buyer and seller of products or services.

Figure 10:
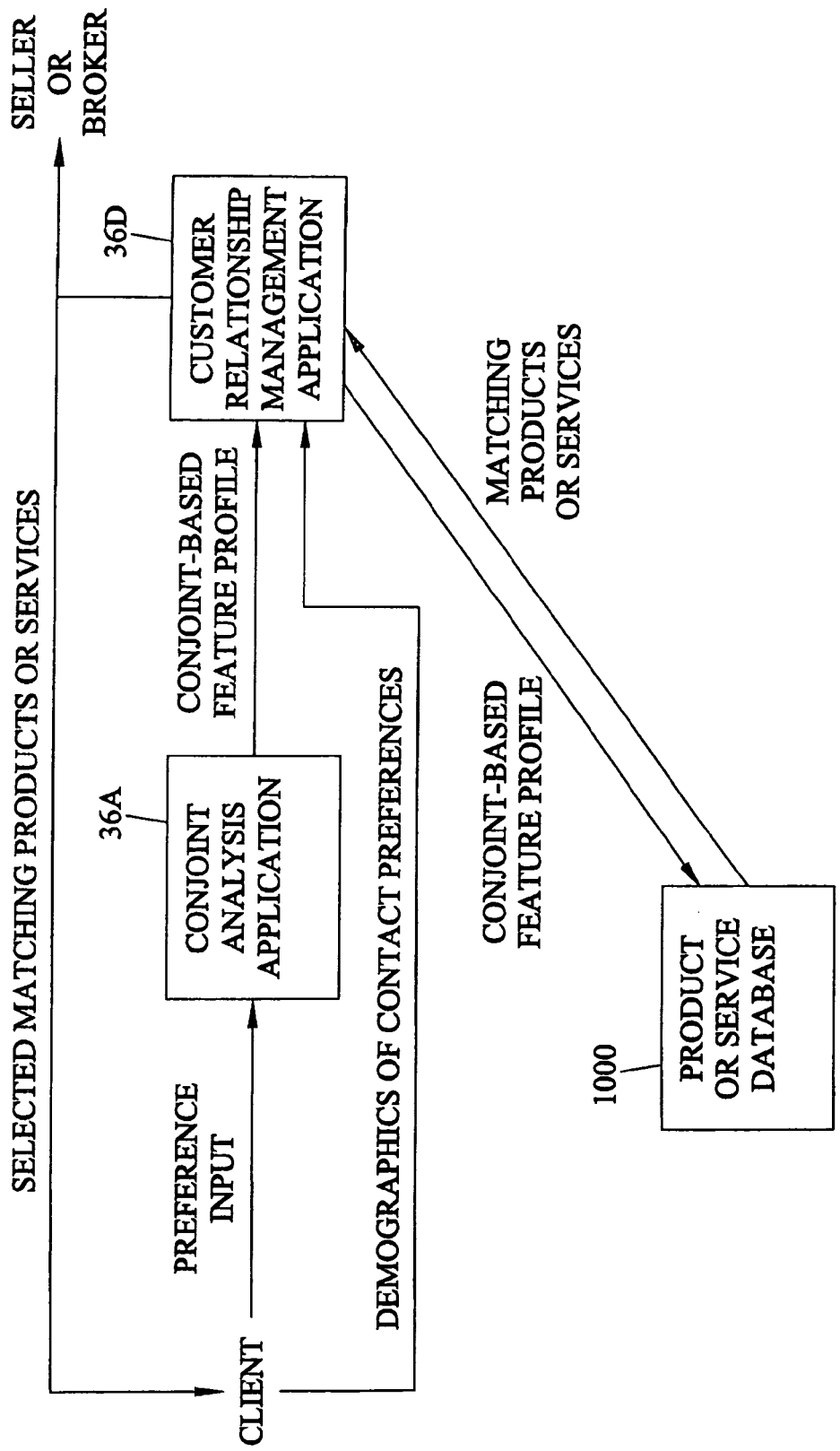
FIG. 10 is a block diagram illustrating a system for facilitating user interaction with a customer relationship management application using conjoint analysis according to an embodiment of the subject matter described herein.

FIG. 10 is a block diagram illustrating an exemplary system that combines conjoint analysis software and customer relationship management software as described above. Referring to FIG. 10, conjoint analysis application 36A may include a utilities calculation engine and a user interface generator as described above. Conjoint analysis application 36A engine may allow a user to select a group of attributes that will be presented to the user in a conjoint analysis. Once the user selects the attributes, the user may be presented with importance of difference and paired trade-off questions, and the user's responses to these questions may be recorded. The output of the conjoint analysis is a conjoint-based feature profile where each of the attributes selected by the user are rated according to relative utility to the user. For example, in the real estate example provided above, the output of conjoint analysis software 36A may be a list of home features and numbers indicating their relative utilities to the user.

Customer relationship management application 36D may receive demographic and contact preferences from the user or client. Customer relationship management application 36D may also receive the conjoint-based feature profile from conjoint analysis application 36A. Customer relationship management application 36A may then search product or service database 1000 using the conjoint-based feature profile and the demographic information input by the user. Product or service database 1000 may return preferred products or services matching the user's preferences. Customer relationship management application 36D may then communicate the preferred product or services to the user via automated updates regarding the preferred products or services. The preferred products or services may be selected based on relative weights assigned to features in the feature set that appear in the search results. Customer relationship management software 36D may also communicate the conjoint based feature profile and/or the preferred products or services to a seller or broker of the products or services. In the real estate example provided above, the user may receive automatic updates whenever a home that matches the user's conjoint-based feature profile is added to product or service database 1000.

Figure 11:
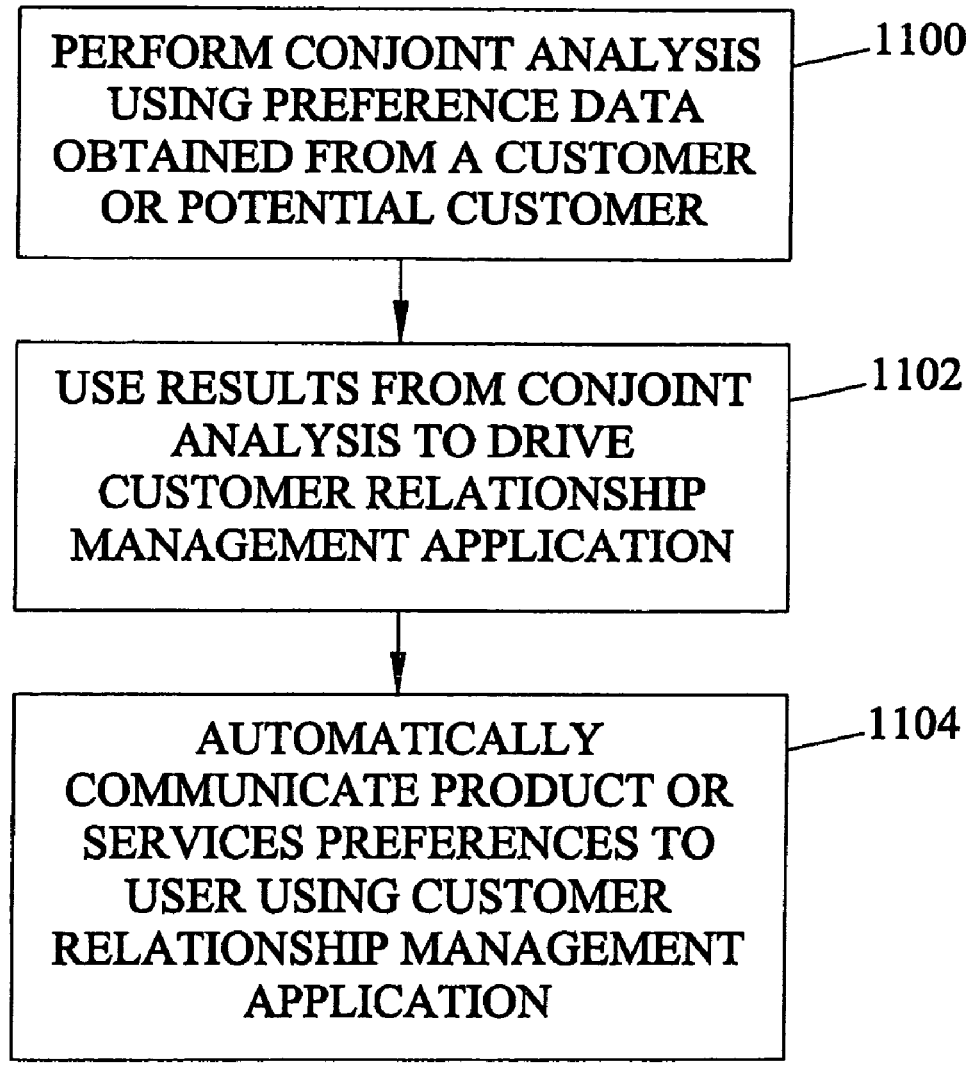
FIG. 11 is a flow chart illustrating an exemplary process for facilitating user interaction with a customer relationship management application using conjoint analysis according to an embodiment of the subject matter described herein.

FIG. 11 is a flow chart summarizing exemplary overall steps for combining conjoint analysis with customer relationship management software. Referring to FIG. 11, in step 1100, conjoint analysis is performed using preference data obtained from a customer or a potential customer. In step 1102, results from the conjoint analysis are used to drive a customer relationship management application. In step 1104, product or services preferences are automatically communicated to the user using the customer relationship management application.

In one exemplary implementation, using conjoint analysis results to drive the customer relationship management application may include communicating a product or service feature set selected by the user to the customer relationship management application. The search of product or service database 1000 may be performed using the product or service features in the feature set. Results from the search may be ranked or selected based on the occurrences of the features in each of the products or services located in the search and the relative utilities output by the conjoint analysis application.

As described in the above-referenced U.S. provisional patent application No. 60/601,187, conjoint analysis may be combined with personality tests and product configuration software. As described herein, conjoint analysis may be combined with customer relationship management and auction software or search engine software. Conjoint analysis may be used with combinations of these conventional tools to achieve desired results. For example, conjoint analysis, personality tests, and customer relationship management software may be used as described herein to improve communication with customers. Any implementation that combines conjoint analysis with one or more of personality tests, product configuration software, customer relationship management software, search engine software and auction software is intended to be within the scope of the subject matter described herein.

Detailed Description of Using CRM and Conjoint Analysis to Facilitate User Selection Among Complex Alternatives The adaptive conjoint software is an application often referred to as "intelligent agent software." With a preference-based "intelligent agent," for example, as the above-referenced U.S. Pat. No. 6,826,541, adaptive conjoint software shoppers see products or services presented in the order according to how well they fit their personal preferences based upon making trade-off decisions. The patented conjoint engine offers sophisticated "sales advisor tools" which quicken the search and make it more precise in matching the needs of the purchaser with product or service specifications.

Intelligent agent software, as embodied in conjoint analysis application 36A, makes the search process considerably more efficient than traditional flat filter systems. As a result, sales representatives, selling agents or other personnel involved in selling who employ these software tools more efficient.

In addition, many and perhaps even most sales agents and personnel involved in selling goods and services employ a variety of software tools to help manage their relationship with clients and prospects. Over the last number of years a category of software called CRM software has emerged, either installed on a personal computer or available via the Internet. The most successful CRM company on the Internet is Salesforce.com, which has thousands of companies and millions of users employing their software solution. The capabilities of this software ranges from software which serves simply as a database of contact information, while the more sophisticated systems include functionality such as contact databases, tickler systems, automated letters, emails or telephone contacts based on a schedule of events or triggered by specified events. Sophisticated CRM software also allows sales personnel and managers to track sales activities and communication.

Combining customer relationship management software with adaptive conjoint search software is a significant step forward in helping selling agents and personnel involved selling goods and services become more efficient and productive. The combination of these software tools is a business process that can dramatically improve efficiency and the productivity.

Below are examples of how precisely adaptive conjoint search software and customer relationship management software will work in combination:

To initiate the process, client or prospect contact information is entered into a database. The information entered includes traditional contact information and information related to the appropriate timing, frequency and mode of communication desired for various interaction. Below is an example of databased information collected for a person searching for residential real estate:

| First Name | Middle Initial | Last Name |
|---|---|---|
| Email Address | Home Phone | Work Phone |
| Cell Phone | FAX Number | |
| Home Address | Business Address | Other address |
| Style of Home Desired | Zip Codes Preferred | State |
| Price range Desired | | |
| Preferred Mode of Communication: | Bus. Phone, Home Phone Cell Phone, email, FAX | Every Day and Evening indications for mode |

-continued

| | |
|---|---|
| Frequency of communication desired for each mode: | Email: Anytime, Daily, Weekly<br>Home Phone: Day, Night, weekend<br>Bus. Phone: Day, Night, weekend<br>Cell Phone: Day, Night, Weekend |
| Key features desired | (e.g. bedrooms, pool, acreage, etc.) |
| Search engine client password | |

These data fields on each client or prospect are then integrated with information from searches from the conjoint software, which refines the list of desired product features and automates the communication process between sales representatives and the client or prospect.

As an example, the sequence of events may be as follows:
1. A prospective homebuyer contacts a realtor and asks for assistance.
2. The realtor collects basic contact information and tells the prospect that he/she will email them with a password to a special web site, which will allow them to do personalized, advanced searches for homes, share contact information and inform the realtor regarding most appropriate times and modes for communication.
3. The realtor has access to the prospect's web pages and search results.
4. Any action taken by the prospect on this personalized web site is automatically communicated to the realtor, both via email alerts and through access to the prospect's web site.
5. Automated actions are driven by the prospect profile and by the results of searches with the conjoint software. Depending upon the actions taken by the prospect and the results of a conjoint exercise, automated communications take place between the realtor and the prospect. Examples include:
   a. Congratulatory and welcome email is sent from realtor to prospect.
   b. Email is sent to prospect highlighting initial search results and suggesting phone call, email or even visits to top listed properties.
   c. The search engine uses the prospect's profile and searches the homes database 4 times each day. If a new home appears that fits the profile, and automated email is sent to the prospect from the realtor informing them and suggesting courses of action.
   d. Depending upon prospect preferences, the realtor is sent an alert on new properties and suggests the agent call the prospect.

In this real estate example, the benefit to the realtor and the prospect is that communication is taking place between the two parties with little effort by either party. This greatly enhances the relationship, increases efficiency and convenience and builds a stronger relationship between them.

This same process of combining adaptive conjoint searching with customer relationship management software can be employed in nearly any domain where a customer, client or prospect desires to search for products or services and a manufacturer, sales representative or sales agent desires to have on-going communication with the purchasing party. Examples include, but are not limited to, 1) auto sales people and dealerships, 2) insurance sales personnel and brokerages, 3) retail sales personnel and online or in-store retail organizations; 4) manufacturers and distributors of commercial products; 5) travel agents and agencies or online travel companies; 6) on-line auction companies; and any other individual or business where advanced search tools and maintaining customer relationships are important.

Citing the real estate example as an illustration, when a realtor or brokerage combines lead management capabilities with the suite of advanced search tools they suddenly have a solution to one of the biggest problems being created by the changing buying process being created by the Internet:
1) they create an on-line feedback loop between prospective home buyer and themselves, and
2) they offer a differentiating search tool which allows them to keep-up with the activities and needs of their prospects. (a process they previously did primarily face-to-face).

This "combo" application allows them to continue showing homes, while staying in touch with prospects. It cements their relationships, thus reducing the likelihood that a prospect will shop with multiple agents. In addition, because of the advanced search tools which show homes in priority order, according to how well they fit their preference profile, when they do get to the point of showing homes in-person, they likely will spend less time driving from one house to another. They will start with the top three homes, then if necessary move down the prioritized list. The likelihood of a prospect purchasing a home more quickly is greatly enhanced.

Seven Key Value Propositions for Clients

1. The Combination of conjoint search and CRM increases customer retention. As a "gift" from agent to consumer, the agent gives a prospective customer a password to our advanced search tools, which cements their relationship, and then can track their searches, aid in additional searches and automatically follow-up with new information and new listings for that customer.
2. Lead Management is enhanced through combining sophisticated customer relationship customer management and conjoint search tools. Email communication will be automated and agents can track changing customer preference profiles and requests. These tools may also allow sponsoring brokerages to track agent productivity, control client access and understand market preferences for sales and listing assistance. The tools allow a more consultative approach and better follow-up.
3. Conjoint and CRM Increases agent/broker productivity: A 10%+increase in sales is expected for agents. That means the average agent/broker will sell 1 to 2 more houses per quarter and increase their revenue from $10,000 to $20,000 per year. This increased productivity also reflects on the company's bottom-line.
4. Conjoint and CRM Aids Agent Recruitment and Retention: Our tools differentiate a brokerage, increase productivity and earnings and allow monitoring of agent/customer activities.
5. Conjoint mirrors trade-off thinking: Everyone makes trade-offs in selecting a home or rental property. Our software captures trade-off preferences for a more precise search.
6. Lead generation is enhanced. The intuitive profiling tool, plus a thoughtful approach toward gathering contact information will immediately increase the number of leads generated by agent and company web sites.
7. Training: Training is extremely important in real estate, where high turnover is the norm and untrained people are entering the market as agents. Using our tools to train new agents will save time and improve the quality of agent training.

CRM and Conjoint Example

An example of functionality resulting from the use of the conjoint matching software with customer relationship management software is below:

MyBode Matching & Compatibility Systems

MyBode is a company, founded by the inventor of the subject matter described herein, which synchronizes use of conjoint search software with CRM software described herein. The preference profile generated by the conjoint matching tool is linked to a database of homes that are for sale. In most cases, this is through a database supplied by a multiple listing service company (MLS). The conjoint software enables people to determine which homes meet their personal preferences at a high level of specificity. At the same time, the results of the conjoint exercise also work in concert with the CRM software to tailor communications between the agent representing the seller of the property and the user of the software, who is most often the prospective buyer of a real estate property. In registering to use the software, the user answers a series of questions about himself or herself (demographics) and then a series of questions related to when they plan to move, if the user is a first-time home-buyer, if the user is pre-qualified for a loan and what geographic locations the user most prefers. The user also puts into the system contact information and information related to when and through what channels they prefer to be contacted. The CRM system, using the results of the user's input of contact information and their conjoint-based preference profile for home features, then establishes an automated communications link between the buyer's agent and the prospective buyer (the conjoint user) with information in the communication completely tailored by the results of the conjoint information and the contact information placed into the system by the user. Below is a sample of the MyBode conjoint and CRM system and how the two functionalities are combined into one system:

Background or Demographic Information Examples:

| | |
|---|---|
| Expected Move Date | (Select from a calendar) |
| First time home buyer | (Yes or No) |
| Pre-Qualified for a loan | (Yes or No) |
| Best times to contact | (Select from a common list) |
| Preferred mode of contact | (Telephone, email, text message, other) |
| Marital Status | (Select from a common list) |
| Number of Children | (Select from a common list) |
| Ages of Children | (Fill in blanks) |
| Income | (Select from a category) |
| Type of real estate of interest | (Select from a category) |
| Geographic area of interest | (Select by state, zip code or map) |

Conjoint Exercise Feature Examples

| | |
|---|---|
| Price range | (Select from a common list) |
| Number of Bedrooms | (Select from a common list) |
| Number of Bathrooms | (Select from a common list) |
| Lot size | (Select from a common list) |
| Schools | (Select from a common list) |
| Type of Home | (Select from a common list) |
| Age of Home | (Select from a common list) |
| Street features | (Select from a common list) |
| Garage | (Select from a common list) |

Further explanation of some of the categories above:
As an example of how the conjoint matching system is combined with CRM software, such as that offered by the company, MyBode, Inc., the items above, the information provided by the user, plus the attributes selected by the user for a conjoint exercise, would inform the CRM software regarding what information to provide the user and the mode through which this information would be provided.

Below is an example:

Instructions for the User:

For example, the user would be informed by the system that the conjoint search will be limited to the type of real estate of interest and geographic location indicated in the user's contact profile. The user then will be asked to click on all attributes below that they believe are important in identifying and selecting a real estate property: For the purpose of this example, the user selects 8 attributes from above:

1. Price range
2. Number of Bedrooms
3. Number of Bathrooms
4. Type of Home
5. Age of Home
6. Lot size
7. Garage
8. Street Features It is expected that most users would select (click) on at least 10 attributes and some may select in the range of 15 attributes.

The conjoint analysis software may then ask the user to rate (on a 1-5 or 1-9 scale) how important each attribute is to them. Based upon which attributes the user selects and the importance rating for each attribute, the conjoint analysis software may set-up a paired-comparison trade-off exercise for each user. The pairs may be as follows:

If you had a choice of

| | | |
|---|---|---|
| A home that is new and is $500,000 | vs | A home that is 20+ years old and is $400,000 |
| Which would you choose? | | |
| 1 2 3 4 5 6 7 8 9 | | |

If you had a choice of

| | | |
|---|---|---|
| A home that is on a corner lot and Has no garage | vs | A home that is not on a corner lot and Has a 2 car garage |
| Which would you choose? | | |
| 1 2 3 4 5 6 7 8 9 | | |

If you had a choice of

| | | |
|---|---|---|
| A home on a 1 acre lot With 2 bathrooms | vs | A home on a $\frac{1}{4}^{th}$ acre lot With 4 bathrooms |
| Which would you choose? | | |
| 1 2 3 4 5 6 7 8 9 | | |

If you had a choice of

| | | |
|---|---|---|
| A home with 5 bedrooms Wth A clear lot | vs | A home with 2 bedrooms Wth A wooded lot |
| Which would you choose? | | |
| 1 2 3 4 5 6 7 8 9 | | |

These are examples of trade-off decisions the user would be required to make, which would allow the system to prioritize and order the importance of a range of home features. With the ordering of attributes from the conjoint exercise, the system would then be able to map each user's preference profile to a database of other real estate properties which meet that user's particular interests and preferences.

The above example illustrates how conjoint analysis can be used in an on-line or real estate selection system. The key and differentiating business process, however, is in the design of a customer relationship management (CRM) system that is informed and instructed by the results of the user's input of contact and demographic information and by the results of the conjoint exercise. Historically, CRM systems have been designed by users to collect manually input information about prospective buyers, sometimes track certain behaviors (purchase transactions and inquiries) and automate interaction based on based on this information. With the combination of CRM features and the results from the use of a conjoint preference exercise, CRM communication is dramatically more targeted to the user's needs and preferences. This CRM system, therefore, creates a more highly personal interaction between the agent or seller, and the prospective purchaser of goods or services.

For example, the CRM system created by the company, MyBode, Inc., takes the results of the user's contact information and conjoint exercise, and tailors communication specific to that user's stated communications mode and timing preferences and their conjoint preference profile. The result is consistent and automated communications between prospective buyer and seller (or seller's agent) that is extremely responsive to each individual user. For instance, the system will set-up email alerts from the buyer's agent to the prospective buyer that show only real estate properties which fit into that prospective buyer's "Top Ten Best Fit Homes." Other systems, which do not have the capability of ranking homes by preference profiles can only send alerts that fit broad categories of stated interest by the prospective buyer. The CRM system will also only send alerts based on the stated desire for timing and mode by the user and will only send alerts when new real estate properties appear in the prospective buyer's "Top Ten."

The example presented above is based on a working model in the real estate industry made available in October 2005. This same model will be effective in any market or domain where there are complex products or services and where continuous, highly targeted communication enhances the buying experience for the seller, the seller's agents and the buyers.

Conclusion

The purpose of the preceding section has been to describe a business process, which employs a combination of customer relationship management software and adaptive conjoint advanced search software.

Currently, there are numerous firms offering customer relationship management software for PCs and for The Internet. There are also firms, which offer flat filter searching, but none that offer adaptive conjoint search. Subsequently, there are no firms that have offered a combination of advanced search software with customer relationship management software.

This combination is unique and significantly enhances the ability of those offering goods and services with individuals or organizations that are the purchasers of these goods and services.

Detailed Description of Combining Conjoint Analysis and Search Engines

The purpose of this section is to describe the structure and benefits of combining adaptive conjoint search software with existing search technology used by current Internet search sites such as Google, Yahoo, MSN and others.

Google and other search engines search the Internet based upon a system designed to rank web pages. For Google, the search technology is trademarked as PigeonRank™.

Google and other search engines take keywords in a search request and, through clusters of computers searching thousands of web sites, they determine which sites use these keywords most often. The problem with this approach is that there are tens of thousands of sites, which include keywords that search software like Google captures, but these results often do not truly match the desires for information that the users are seeking.

With the assistance of adaptive conjoint search software used prior to performing a Google, Yahoo, MSN or other search highly accurate descriptions and keywords for a search will be captured and prioritized. Thus, an Internet search conducted with the benefit of conjoint, preference-based software, as a first step will be considerably more accurate in terms of the desires and needs of the user.

The adaptive conjoint software is an application often referred to as "intelligent agent software." Using a preference-based "intelligent agent," for example, as described in the above-referenced U.S. Pat. No. 6,826,541, adaptive conjoint software shoppers see products or services presented in the order according to how well they fit their personal preferences based upon making trade-off decisions. The conjoint engine offers a sophisticated matching based on ascertaining a precise narrowing of search criteria attribute ranking.

Intelligent agent software, as embodied in conjoint analysis application 36A makes the search process considerably more efficient than traditional flat filter systems.

With many of the current search engine enterprises, such as Google, Yahoo and MSN, moving to "sponsored search" business models, the public will become less and less certain that search results are objective, based on the user's desires rather than a priority established based on what commercial or public enterprise is willing to pay the highest fee. The conjoint-based search software, based completely on the users' preferences will re-establish trust in search engines and Internet portals which offer, at least as an option, our objective conjoint search tools.

Traditional Internet search tools are relatively non-specific, gross search tools. While they have helped create interest and demand on the Internet, and helped millions upon millions of users find information; the level of information available on virtually any topic is huge and overwhelming. Results, therefore, are very inefficient. For example, a Google search for "Breast Cancer" results in 3,500,000 references. A search for automobiles results in 3,200,000 references. A search for "musical instruments" results in over 9,000,000 references. Narrowing the search to "musical instruments, guitars" reduces the number to 900,000 references. Adding the words "under $500" reduces the guitar search to 24,000 references. How does a user review 24,000 sites to make a decision? And how does a Google search understand what is most important to the user? Is "musical instrument," "guitar," or "under $500 most important?

The use of the sophisticated statistics employed in an adaptive conjoint decision software application can help determine, at a high level of precision, what attributes in a search of most important, order those search criteria and then let Google, Yahoo or other search engines do what they do best: search thousands of sites rapidly and efficiently. The combination of these software tools is a business process that can dramatically improve efficiency and the productivity.

With Google Advanced Search, for instance, a user can not only search on keywords, but can require that all search words be included in the results, an exact phrase be the determining factor in the search, or that a least one word in the search string be included in results.

If a user employs conjoint at the beginning of a search, through trade-offs between competing concept or search terms, this process would enable the user to prioritize the search string in such a manner that the results would be more likely to reflect that user's true preferences for results.

Below is a description of how precisely adaptive conjoint search software and Google type searches, when combined, will offer users considerably more efficient and satisfying results:

To initiate the process, a user will select a general category, such as Automobiles, Cancer, Homes, Computers, etc. After selecting the general category, a list of sub-categories will be displayed which will allow the user to narrow the search. At this point, a list of attributes will be displayed, which allows the user to click on no less than 4 and as many as the totality of attributes shown to begin the conjoint exercise. A combination of categories by topic may be customized for interfacing with any traditional search engine with which our application will interface. For example, Yahoo Search develops categories using human experts. Google, on the other hand, develops categories through aggregating numbers of site links from user searches. The present application may be customized to work with categories created or supplied by any search engine with which the application interfaces. Below is an example of how a conjoint exercise would be incorporated into a more traditional search through Google, Yahoo, MSN or any other web search site:

The first example relates to searching for information about a disease, including symptoms, diagnoses, and treatments. The first example is a search for breast cancer.

A list of major categories is presented to the user (for example):

| Select A Category |
| --- |
| Automobiles |
| Consumer electronics |
| Dating & Relationships |
| Medical & Health Issues |
| Sports |
| Travel & Leisure |
| World Politics |

When as user clicks on a category (in this case Medical & Health Issues), the preliminary screening functionality of the conjoint software narrows the gross parameters of the search as follows:

| Medical & Health Issues |
| --- |
| General Information |
| Symptoms |
| Treatments |

In the example, the user clicks on "treatments" and is taken to a next menu:

| Disease Category (the list will be extensive) |
| --- |
| Allergies |
| Broken bones |
| Cancer |
| Gastrointestinal |

The manner in which current search engines, such as Google, Yahoo, MSN and others rank or weight keywords will matter only in the manner in which our conjoint engine passes priority ordering to those search engines. If keywords are weighted according to the order in which they are entered into the search line, then the results of our conjoint software will be sent to the search engine in this manner. If there is no weighting in the current search engine's algorithm, then our conjoint engine may either create a weighting system or sequence a series of searches in priority order, according to the results of the conjoint exercise. Our conjoint application may allow user-defined weights if this approach is deemed to specify a search that best matches the users needs. In a preferred implementation, the conjoint analysis application may be structured such that it can communicate keywords and relative weights to any suitable search engine.

The user in this example clicks on cancer, then "breast cancer," and then is presented with a list of attributes and goes through the three-stage conjoint exercise. The user clicks on the attributes of importance to them, rates those attributes and then makes trade-offs decisions; the result of which is a list of attributes for a Google or Yahoo search with the features or attributes of that search prioritized at a hexadecimal level scoring system.

The search criteria sent to the Google, Yahoo styled search engine might appear as follows:

| Send Search Criteria as follow: | Score |
| --- | --- |
| Cancer | 145691 |
| Breast cancer | 169995 |
| Surgical procedures | 179697 |
| Risk factors | 189893 |
| Mortality data | 178676 |
| Ranking of facilities offering services | 186872 |
| Ranking of doctors offering procedures | 197893 |

With these attributes, clearly indicating the user's priorities for results allows the Google or Yahoo search to be very specific and the results to be extremely accurate.

This same process of combining adaptive conjoint searching with Google or Yahoo styled search software can be employed in nearly any domain where a user seeks highly specific information through The Internet. While it could be used for all searches, we believe that this more time-consumer approach would likely be employed on for complex searches where precise results create efficiency and much higher user satisfaction.

Seven Key Value Propositions for Clients

1. The Combination of conjoint search and traditional Internet search software increases user efficiency and satisfaction. The volume of sites displayed as a result of their search often frustrates users of Internet search, and most of the displayed sites are irrelevant to their actual inquiries. Using conjoint software which forces the user to prioritize the user's preferences greatly, enhances the accuracy of search results, reducing time and increasing satisfaction.
2. Traditional search engines precision is considerably enhanced through combining conjoint search tools with traditional search systems. Precision of results is a key factor in building a new system. Current search engines retrieve hundreds and thousands of sites with selected keywords. With an adaptive conjoint, personal preference software interface, and individual user's precise information request will be obtained and will then feed this information, in priority order, to the traditional search engine.
3. Conjoint and traditional search increases user productivity: While a conjoint "front-end" on a traditional search may take a few moments longer, the precision of the results will greatly reduce the time involved in finding relevant information on The Internet and therefore greatly increase user productivity in finding the most appropriate information.
4. Conjoint and traditional search tools reduce use of servers: The more precise a request for information from a user, the less resources and time will be required to find the most appropriate results.
5. Conjoint mirrors trade-off thinking: Everyone makes trade-offs in selecting a home or rental property. Our software captures trade-off preferences for a more precise search, while being intuitively comfortable for users.
6. Commerce on The Internet should increase in velocity with more precise search. The velocity of commerce transactions on the web will increase monetary value to organizations and individuals selling goods and services. With more precise results from Internet searches, it is expected that the volume of completed transactions will be increased through use of conjoint software in combination with traditional search systems.
7. Training: Training is extremely important in helping users understand how searches on The Internet work. Using the more intuitive and transparent methods of conjoint software will help train users on more efficient ways to search The Internet, and thus, from a pure human factors perspective, create a continuous loop of improved use of The Internet and more accurate searching.

Combining Conjoint Analysis with Traditional Search Software

The Internet has become a remarkable resource for users to search for information across a nearly limitless array of topics. Companies like Google, Yahoo, MSN, Ask Jeeves, Dogpile and many others offer sophisticated search capabilities which take keywords or phrases and search across millions of web sites which have those keywords and phrases imbedded in their sites. Each of the major search engines has a particular algorithm for searching the Internet and web sites. They all have the ability to allow users to filter their searches at varying degrees of specificity, but they all display a vast number of web sites for any topic, subject, keyword or phrase; and all too often overwhelm the seeker of information with hundreds and even tens-of-thousands of websites that the consumer then has to evaluate individually in order to determine if the specific information they seek is actually on the site. This often takes many hours and often results in a totally frustrating time for the user.

Conjoint software, designed to match an individual user's preferences for features of products or services, working in concert with traditional search software, will serve a valuable purpose in narrowing the search criteria across a very wide array of topical search areas. Combining a conjoint-based user preference profile with keyword or phrase search will dramatically increase the accuracy and rank-order prioritization of topically appropriate web sites during the search process.

A simple example of results from a traditional search, using any Internet search software (including, but not limited to Google, Yahoo, MSN, Jeeves, Dogpile and others) would be as follow:

| | |
|---|---|
| $1^{st}$ Keyword search: | Digital cameras |
| Results: | 123,000 web sites |
| $2^{nd}$ Keyword search: | New Digital Cameras |
| Results: | 88,600 sites |
| $3^{rd}$ Keyword search: | Kodak new digital cameras |
| Results: | 13,100 sites |
| $4^{th}$ iterative keyword search: | 5 megapixel Kodak new digital cameras |
| Results: | 1,960 sites |

It is difficult for a user to determine how to narrow the user's search down to a number that will have the information and functions that the individual user desires for two reasons: 1) they are not certain what keyword search strings will narrow down the results to a manageable number, and 2) even if a seeker is reasonable familiar with keyword search criteria it is difficult for a user to prioritize which keyword or search criterion is most important, second most important, third most important, etc., which is the driver of search routines and results on most, if not all, traditional search engines.

The combination of conjoint matching algorithms, along with traditional keyword search routines offers a powerful enhancement to the world or Internet and even PC-based search. These same routines could be used to search Intranets, mainframe databases of information and content on an individual PC or network.

Below is how conjoint matching software would be combined with traditional search software:

As described above, adaptive conjoint may be used across a similarly broad array of domains. However, it is believed that conjoint analysis has not been previously combined with configuration software to further enhance the decision making process.

A user is looking for the most precise web sites that offer information about digital cameras and sells the digital cameras best suited to his or her needs at the lowest price.

Rather than going to Google®, Yahoo®, MSN® or other traditional search sites; or using one of these sites with an advanced search function including conjoint, the search exercise would likely proceed as follows:

Select a Topic Area: (Select from a common list of topics)
The software would have a very broad array of topical areas from which to select, likely with branching to narrow the fields of initial search. Example for cameras:

Photography
Supplies
Paper
Chemicals
Film
Equipment
Cameras
Film
Digital
Accessories Lens
Tripods
Purchase of . . .

The user would type in a word, which would trigger the branching or click on the general topic area and see the branching. At the point where the user has selected the terminal value for initial screening, a list of attributes for that terminal value would be presented for selection and rating by the user, which would then lead to the trade-off exercises employed with the conjoint exercise. Below is an example for a user who selects: Photography/Equipment/Cameras/Digital.
Based on the general level at which the searcher

| | |
|---|---|
| Price | (Select from a common list of price range) |
| Number of megapixels | (Select from a common list) |
| Brand | (Select from a common list) |
| Shutter Speed | (Select from a common list) |
| Digital zoom features | (Select from a common list) |
| Zoom features | (Select from a common list) |
| Dimensions | (Select from a common list) |
| Docking station | (Yes or No) |
| Flash features | (Select from a common list) |
| Shipping cost | (Select from a common list) |
| Warranty | (Select from a common list) |

Instructions for the User:
Please click on all attributes below that you believe are important in identifying and selecting a digital camera. Then, rate the importance of those features. For the purpose of this example, the user selects 7 attributes from above:
1. Price
2. Number of megapixels
3. Brand
4. Shutter Speed
5. Digital zoom features
6. Optical Zoom features
7. Warranty Conjoint analysis application 36A may then ask the user to rate (for instance on a 1-5 or 1-9 scale) how important each attribute is to him or her. Based upon which attributes they select and the importance rating for each attribute, the conjoint analysis application may set-up a paired-comparison trade-off exercise for each user. The pairs may be as follows:
If you had a choice of a camera that

| | | |
|---|---|---|
| Is 3 megapixels | vs | Is 5 megapixels |
| And costs | | And costs |
| $100 | | $400 |
| | Which would you choose? | |
| | 1 2 3 4 5 6 7 8 9 | |

If you had a camera

| | | |
|---|---|---|
| With a six-month warranty | vs | With a 2-year warranty |
| And | | And |
| Optical Zoom | | No Optical Zoom |
| | Which would you choose? | |
| | 1 2 3 4 5 6 7 8 9 | |

If you had a choice of a camera with

| | | |
|---|---|---|
| Made by Kodak | vs | Made by Sony |
| and | | and |
| 3 megapixels | | 5 megapixels |
| | Which would you choose? | |
| | 1 2 3 4 5 6 7 8 9 | |

If you had a choice of camera

| | | |
|---|---|---|
| A 3 X Digital zoom | vs | A 10X Digital Zoom |
| and | | and |
| Costing $200 | | Monthly payment of $500 |
| | Which would you choose? | |
| | 1 2 3 4 5 6 7 8 9 | |

The results in the first iteration of the search might be as follows:
$1^{st}$ Search Iteration with conjoint
Results: 26 Sites
These are examples of trade-off decisions the user may be required to make, which would allow the system to prioritize and order the importance of a range of camera features, and likewise, it prioritizes the words in the search-string.

Conjoint analysis application 36A generates a six to eight decimal score for each feature chosen by the user. The rank order of these features, from most important to least important is then used to create the search string that is used in the traditional key work search. For instance, the created search string might be ($300 (0.986757), optical zoom (0.876895), 2 year warranty (0.786799), no shipping charge (0.755988), Kodak (0.700897)), with the decimal weight beside the keyword search terms.

The results from this advanced search, combining conjoint with traditional search software reduces the number of sites many-fold and prioritizes the sites by ranking their relevance to the user's desires. The results would indicate the #1 Best Fit, #2 Best Fit, #3 Best Fit, #4 Best Fit, etc., and the "Best Fit" indication would truly represent the preferences of the user.

Figure 12:
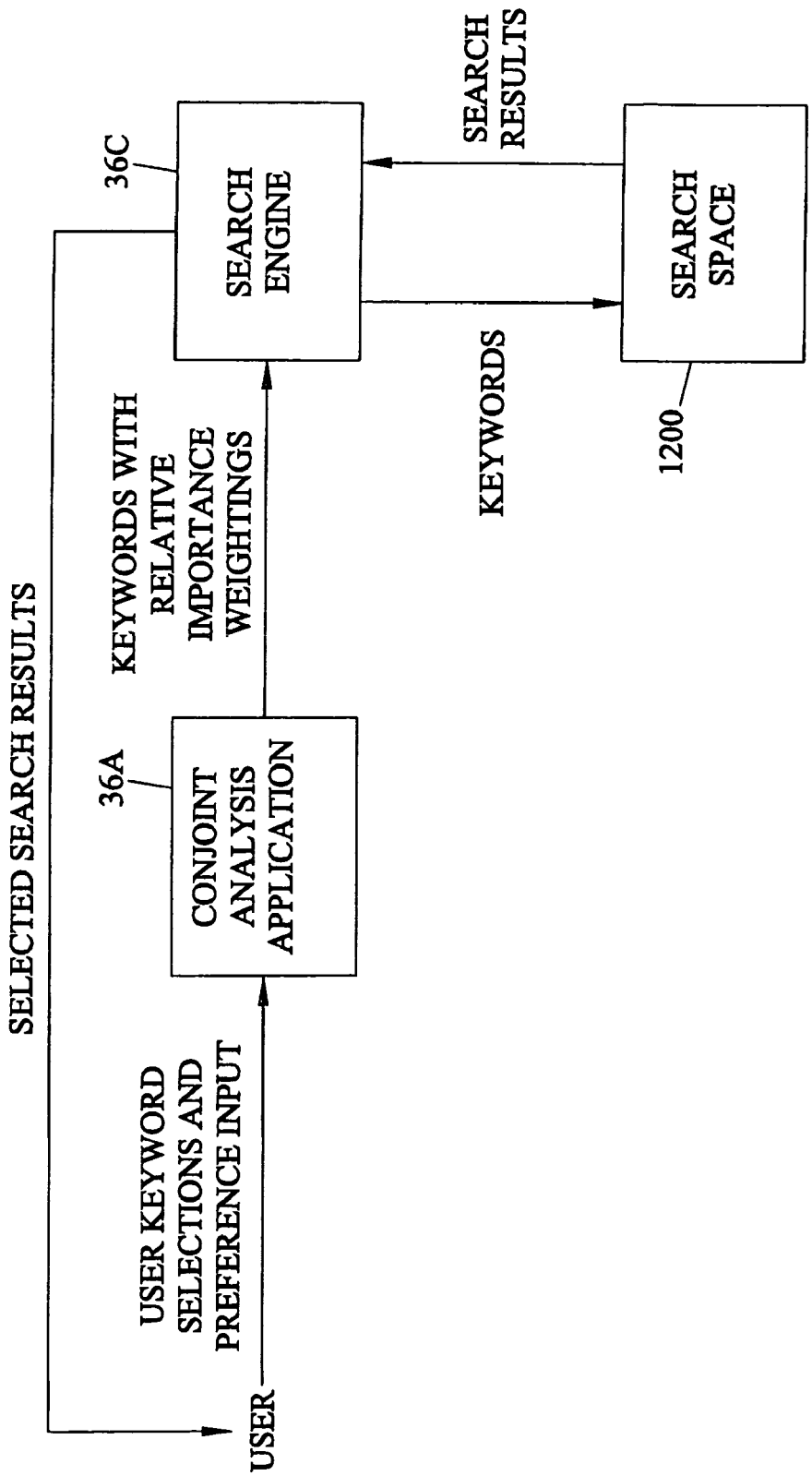
FIG. 12 is a block diagram illustrating a system for facilitating user interaction with a search engine using conjoint analysis according to an embodiment of the subject matter described herein.

FIG. 12 is a block diagram illustrating an example of a system that combines a conjoint analysis application with search engine software according to an embodiment of the subject matter described herein. Referring to FIG. 12, conjoint analysis 36A receives user keyword selections and preference input from a user. The keyword selections may be the presented to the user in paired trade-off decisions. Conjoint analysis application 36A may then output keywords with relative utility weightings to search engine 36C. Search engine 36C may perform a search of search space 1200 using the keywords. Search space 1200 may be any suitable search space, such as the Internet, a database, or other data repository. Search engine 36C may then select results of the search to be output to the user using the relative utility weightings.

Figure 13:
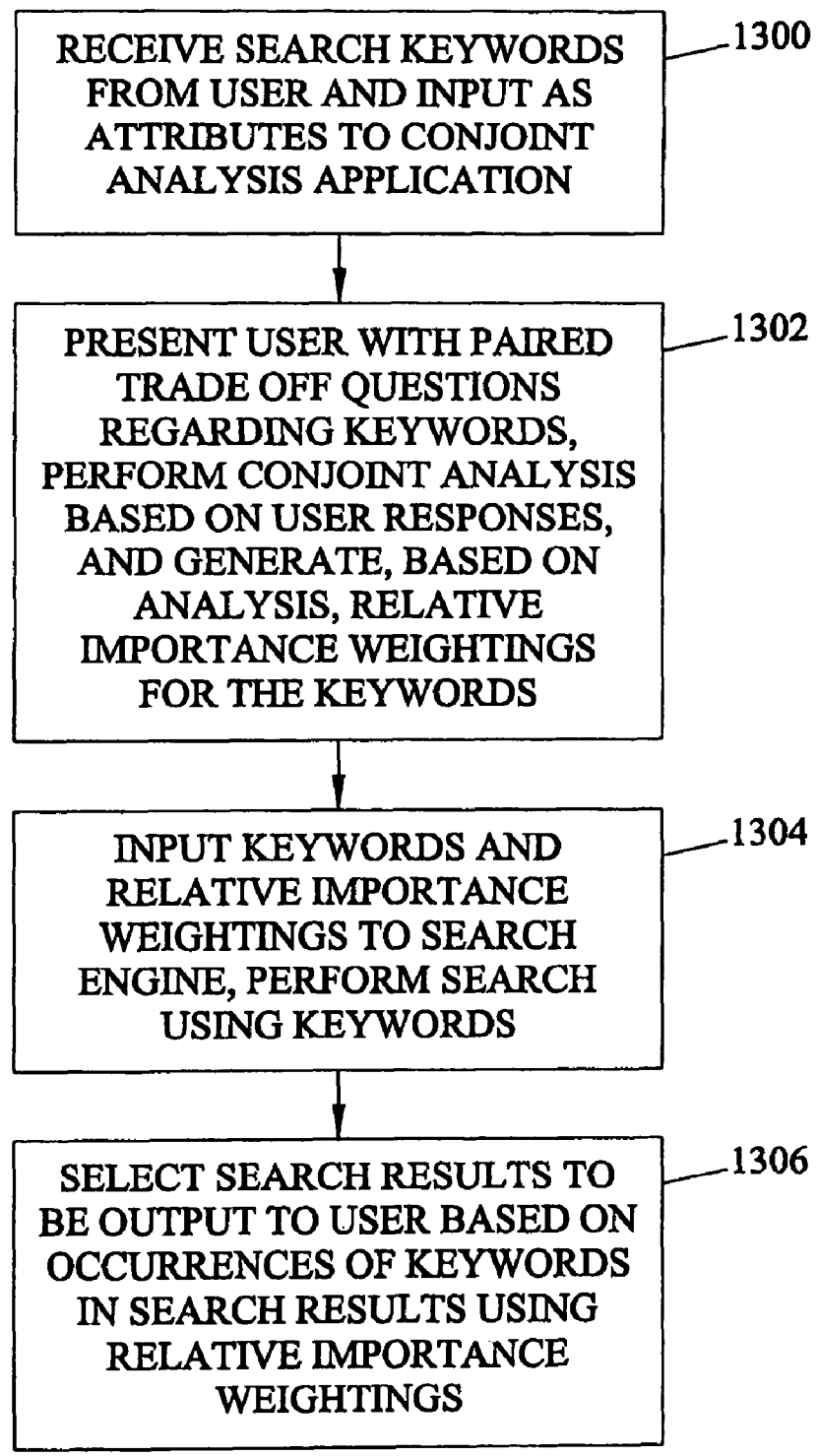
FIG. 13 is a flow chart illustrating a process for facilitating user interaction with a search engine using conjoint analysis according to an embodiment of the subject matter described herein.

FIG. 13 is a flow chart illustrating exemplary steps for combining conjoint analysis with a search engine according to an embodiment of the subject matter described herein. Referring to FIG. 13, in step 1300, search keywords are received from a user and input as attributes to a conjoint analysis application. In step 1302, the user is presented with paired trade-off questions regarding the keywords. Conjoint analysis is performed based on user responses to the questions. Based on the conjoint analysis, relative importance weightings are generated for the keywords. In step 1304, the keywords and relative importance weightings are input to a search engine, and a search is performed using the keywords. The results are output to the user are selected based on the occurrences of the keywords in the search results and the relative importance weightings. For example, steps 1300 and 1302 may be executed to obtain keywords from a user and compute relative importance weightings for the keywords as described above. In step 1304, the keywords may be input into the search engine. In step 1306, the relative importance weightings may be used to prioritize search results. For example, search results with a large number of high importance keywords may be ranked higher than search results with the same number of occurrences of low-importance keywords. One advantage of using conjoint analysis in this manner is that the manner in which the search engine performs the initial search would not have to be altered to accommodate weightings.

Conclusion

The purpose of the preceding section has been to describe a business process, which employs a combination of adaptive conjoint advanced search software and more traditional search methods employed by firms, including but not limited to Google, Yahoo, Dogpile, MSN and other search tools.

This combination is unique and significantly enhances the ability people searching The Internet to greatly reduce the number of site references and increase the precision of results from a search. This increased efficiency serves the using population by making The Internet much more friendly and enhances usability.

Conjoint software may be combined with any conventional search engine technology to achieve a prioritized, more-focused search. Examples of search engines with which conjoint analysis may be combined are described the excerpts from various search engine patents listed below.

Combining Conjoint Analysis with Auction Software

Auction software applications have been developed over the last 10 years, represented with the success of Internet applications such as on Ebay, Yahoo Auctions, Ubid, Amazon and others. This technology has allowed individuals and business enterprises to offer products and services, the price of which is determined through auction algorithms which allow open and competitive bidding. While adaptive conjoint determines the order of a persons preferences for features of products or services, auction software applications use flat filter systems to allow users to search for product categories, which they then can view, review specifications or features and then decide whether or not to bid and at what price. Auction software also allows users to track the bidding on desires products or services. One of the limitations of current auction software is that the search applications within these software applications do not employ sophisticated preference profiling capabilities which include the use of adaptive conjoint statistical techniques.

A simple example of auction software might allow a user to search for products or services by broad categories, such as "real estate," "computing and networking," "toys," "automobiles," or "musical instruments," among many other categories. But other than searching by these broad categories there is little functionality which allows users to narrow their searches, and particularly no functionality which allows users to select attributes or features of products, make trade-off decisions about those features and narrow their searches significantly. The combination of existing auction software functionality and adaptive conjoint can represent a significant step forward in tools to help people make better, faster decisions from among complex alternatives.

This auction software currently exists and is offered by multiple corporations on their own sites and by software providers. A similar approach, combining auction software with adaptive conjoint software can be employed across a wide range of domains, including, but not limited to computers, real estate, automobiles, motorcycles, boats, farm equipment, software applications, and even such things as health plans, financial plans and consulting services. The possibilities are very broad for use of this approach.

As described above, adaptive conjoint may be used across a similarly broad array of domains. However, it is believed that conjoint analysis has not been previously combined with auction software to further enhance the decision making process.

Similar to the use of customer relationship management software results in combination with the adaptive conjoint software described herein, auction software functionality may be combined with conjoint analysis in a number of different ways. In one exemplary implementation, auction software may be combined with conjoint analysis by using the auction software to determine which broad classifications of products or attributes are presented for selection to a user at the beginning of the trade-off exercise. In an alternate implementation, the adaptive conjoint exercise may be used to determine which limited number of goods will be presented to the user by the auction software.

In the first example, for instance in finding an automobile on an auction web site, the auction software may determine that the user does not desire to even look at convertibles, SUVs or trucks. The auction software may also place limits on the price range of given automobiles which will be displayed. The results of the conjoint exercise, therefore, will only be mapped to a more limited number of automobiles which are available on that particular site. Similarly, if the conjoint exercise is conducted first, it might determine which features or attributes are presented to the user by the auction software.

The Internet has become a remarkable resource for users to search for and purchase a very wide array of products. A phenomenon on the Internet which has been extremely active has been sites which offer products or services through online auction, allowing a truly dynamic marketplace to provide access to merchandise from individual consumers, small companies and large corporations. The auction marketplace clearly establishes dollar value on merchandise, from antique papers, to antique furniture, to computers, cameras, sports equipment, comic books, art, musical equipment and almost any product; new or old, that can be sold in any market place.

The attribute scoring system resulting from a conjoint search on an auction site may not only display products in priority order, but may also assist a user in determining the price for bidding a user may employ in the auction process.

Companies like eBay, Overstock, uBid, Bidz, and many others offer sophisticated auction software across a broad range of product categories. Each of the major auction sites has a search engine to find products the user is seeking, but the search engines are traditional flat filters. Flat filters in this case are defined as search based on keywords, with no weighting if multiple words are used in the search string. As a result product or service search on auction sites could be greatly enhanced through use of a preference profiling search system, such as the patented conjoint search software. Auction-site search software allows users to filter their searches by simply adding words to a search-string, but gives the user no ability to weight the importance of each search term.

The subject or keyword search all too often overwhelm the seeker of information with hundreds and even tens-of-thousands of products offered for bid under an auction are shown in results, and the user must then manually sort through a large number of products that broadly fit search criteria. The consumer then has to evaluate each item individually in order to determine if which product or service on which they would like to bid in the auction. This can be a laborious and time-consuming task. With the aide of a conjoint-based preference profiling system, combined with that database of offerings on the auction website, it will be a streamlined process to find the products or services that the user most desires to purchase. The conjoin-based search, then, will allow the user to see and compare very similar products, in priority order of statistical best-fit, in order to determine on which product they should bid and to evaluate how much they should bid for that particular product or service.

Conjoint software, designed to match an individual user's preferences for features of products or services, working in concert with traditional search software, will serve a valuable purpose in narrowing the search criteria across a very wide array of topical search areas. Combining a conjoint-based user preference profile with keyword or phrase search will dramatically increase the accuracy and rank-order prioritization of topically appropriate web sites during the search process.

A simple example of results from a traditional search, using any Internet search software including, but not limited to eBay, Overstock, uBid and other auction sites would be as follow:

| | |
|---|---|
| 1st Keyword search: | Digital cameras |
| Results: | 68,000 |
| 2nd Keyword search: | New Cameras |
| Results: | 15,500 sites |
| 3rd Keyword search: | Kodak new digital cameras |
| Results: | 628 sites |
| 4th iterative keyword search: | 5 megapixel Kodak new digital cameras |
| Results: | 1,960 sites |

The combination of conjoint matching algorithms, along with traditional keyword search found on most auction sites offers a powerful enhancement to the world or Internet and even PC-based search. These same routines could be used to search Intranets, mainframe databases of information and content on an individual PC or network.

Below is how conjoint matching software would be combined with traditional search software:

As described above, adaptive conjoint may be used across a similarly broad array of domains. However, it is believed that conjoint analysis has not been previously combined with auction software to further enhance the matching and searching process.

A user is looking for the most precisely described products that are offered about digital cameras and is more easily able to determine an appropriate bid price.

Rather than going to eBay, Overstock, uBid or other traditional auction sites; or using one of these sites with an advanced search function including conjoint, the search exercise would likely proceed as follows:
Select a Topic Area: (Select from a common list of topics)
The software would have a very broad array of topical areas from which to select, likely with branching to narrow the fields of initial search. Example for cameras:

```
                Photography
                  Supplies
                   Paper
                  Chemicals
                    Film
                 Equipment
                   Cameras
                    Film
                   Digital
                 Accessories
                    Lens
                  Tripods
                Purchase of . . .
```

The user would type in a word, which would trigger the branching or click on the general topic area and see the branching. At the point where the user has selected the terminal value for initial screening, a list of attributes for that terminal value would be presented for selection and rating by the user, which would then lead to the trade-off exercises employed with the conjoint exercise. Below is an example for a user who selects: Photography/Equipment/Cameras/Digital.

Based on the general level at which the searcher

| | |
|---|---|
| Price | (Select from a common list of price range) |
| Number of megapixels | (Select from a common list) |
| Brand | (Select from a common list) |
| Shutter Speed | (Select from a common list) |
| Digital zoom features | (Select from a common list) |
| Zoom features | (Select from a common list) |
| Dimensions | (Select from a common list) |
| Docking station | (Yes or No) |
| Flash features | (Select from a common list) |
| Shipping cost | (Select from a common list) |
| Warranty | (Select from a common list) |

Instructions for the User:
Please click on all attributes below that you believe are important in identifying and selecting a digital camera. Then, rate the importance of those features. For the purpose of this example, the user selects 7 attributes from above:
1. Price
2. Number of megapixels
3. Brand
4. Shutter Speed
5. Digital zoom features
6. Optical Zoom features
7. Warranty Conjoint analysis application 36A may then ask the user to rate (for instance on a 1-5 or 1-9 scale) how important each attribute is to him or her. Based upon which attributes they select and the importance rating for each attribute, the conjoint analysis application may set-up a paired-comparison trade-off exercise for each user. The pairs may be as follows:
If you had a choice of a camera that

| | | |
|---|---|---|
| Is 3 megapixels | vs | Is 5 megapixels |
| And costs | | And costs |
| $100 | | $400 |
| | Which would you choose? | |
| | 1  2  3  4  5  6  7  8  9 | |

If you had a camera

| With a six month warranty | vs | With a 2 year warranty |
| And | | And |
| Optical Zoom | | No Optical Zoom |
| | Which would you choose? | |
| | 1 2 3 4 5 6 7 8 9 | |

If you had a choice of a camera with

| Made by Kodak | vs | Made by Sony |
| and | | and |
| 3 megapixels | | 5 megapixels |
| | Which would you choose? | |
| | 1 2 3 4 5 6 7 8 9 | |

If you had a choice of camera

| A 3 X Digital zoom | vs | A 10X Digital Zoom |
| and | | and |
| Costing $200 | | Monthly payment of $500 |
| | Which would you choose? | |
| | 1 2 3 4 5 6 7 8 9 | |

The results in the first iteration of the search might be as follows:

$1^{st}$ Search Iteration with conjoint

Results: 26 Sites

These are examples of trade-off decisions the user may be required to make, which would allow the system to prioritize and order the importance of a range of camera features, and likewise, it prioritizes the words in the search-string.

The conjoint matching software generates a six to eight decimal score for each feature chosen by the user. The rank order of these features, from most important to least important is then used to create the search string that is used in the traditional key work search. For instance, the created search string might be ($300 (0.986757), optical zoom (0.876895), 2 year warranty (0.786799), no shipping charge (0.755988), Kodak (0.700897)), with the decimal weight beside the keyword search terms.

The results from this advanced search, combining conjoint with traditional search software reduces the number of sites many fold and prioritizes the sites by ranking their relevance to the users desires. The results would indicate the #1 Best Fit, #2 Best Fit, #3 Best Fit, #4 Best Fit, etc., and the "Best Fit" indication would truly represent the preferences of the user.

Figure 14:
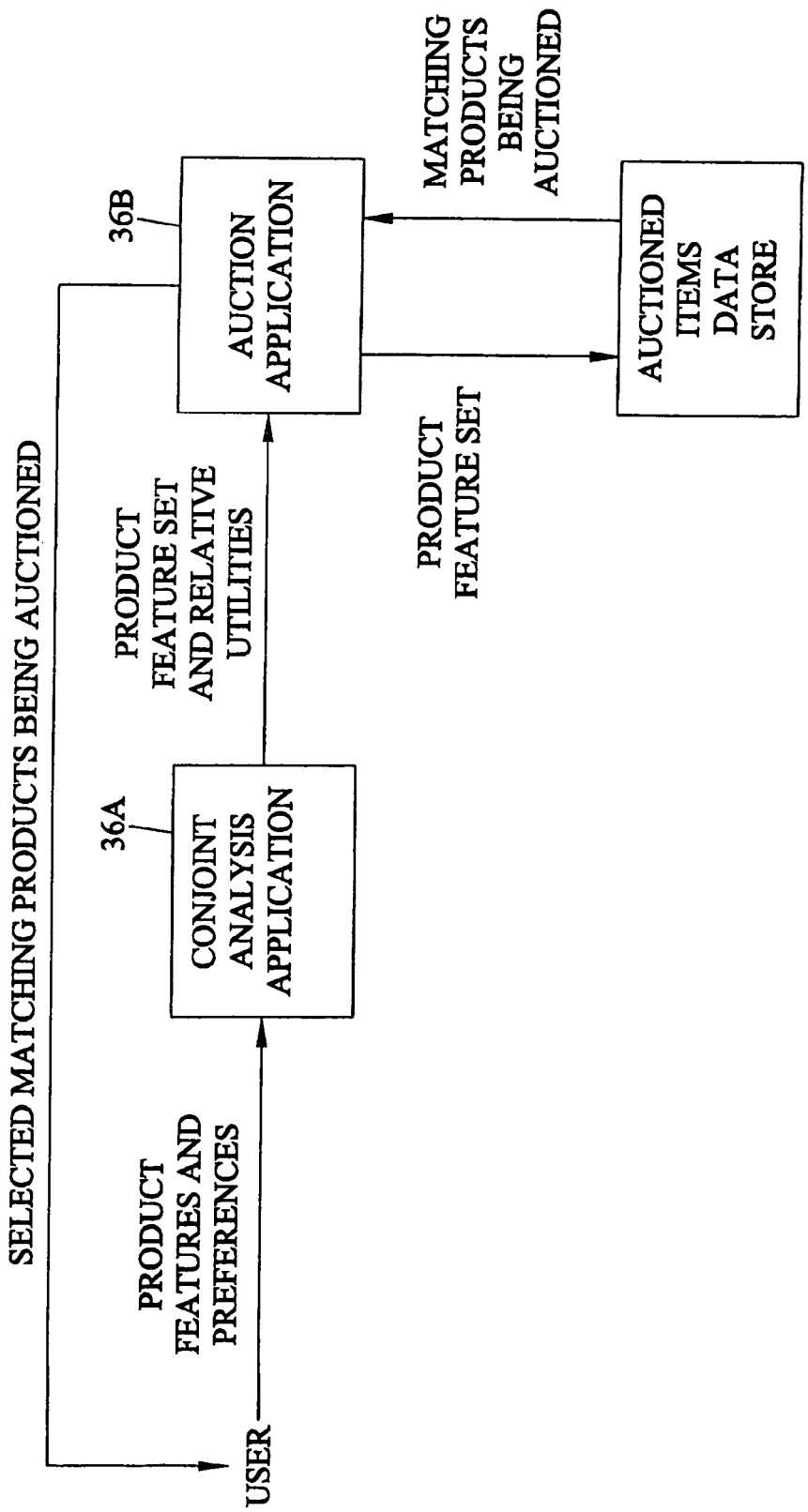
FIG. 14 is a block diagram illustrating a system for using conjoint analysis to facilitate user interaction with auction software according to an embodiment of the subject matter described herein.

FIG. 14 illustrates an exemplary system that combines conjoint analysis software and auction software according to an embodiment of the subject matter described herein. Referring to FIG. 14, conjoint analysis application 36A receives user input regarding product features. Conjoint analysis application 36A treats these features as attributes or a conjoint analysis exercise. Conjoint analysis application 36A presents a user with paired trade-off questions and receives user input regarding preferences. Conjoint analysis application 36A generates, based on the analysis, a product feature set with features ranked or classified according to relative utilities.

Auction application 36B receives the product feature set and relative utilities and performs a search in auctioned items data store 1400. The result of the search is matching products being auctioned that match the feature set and relative utilities. Auction application 36B outputs a list of the matching products being auctioned to the user.

Figure 15:
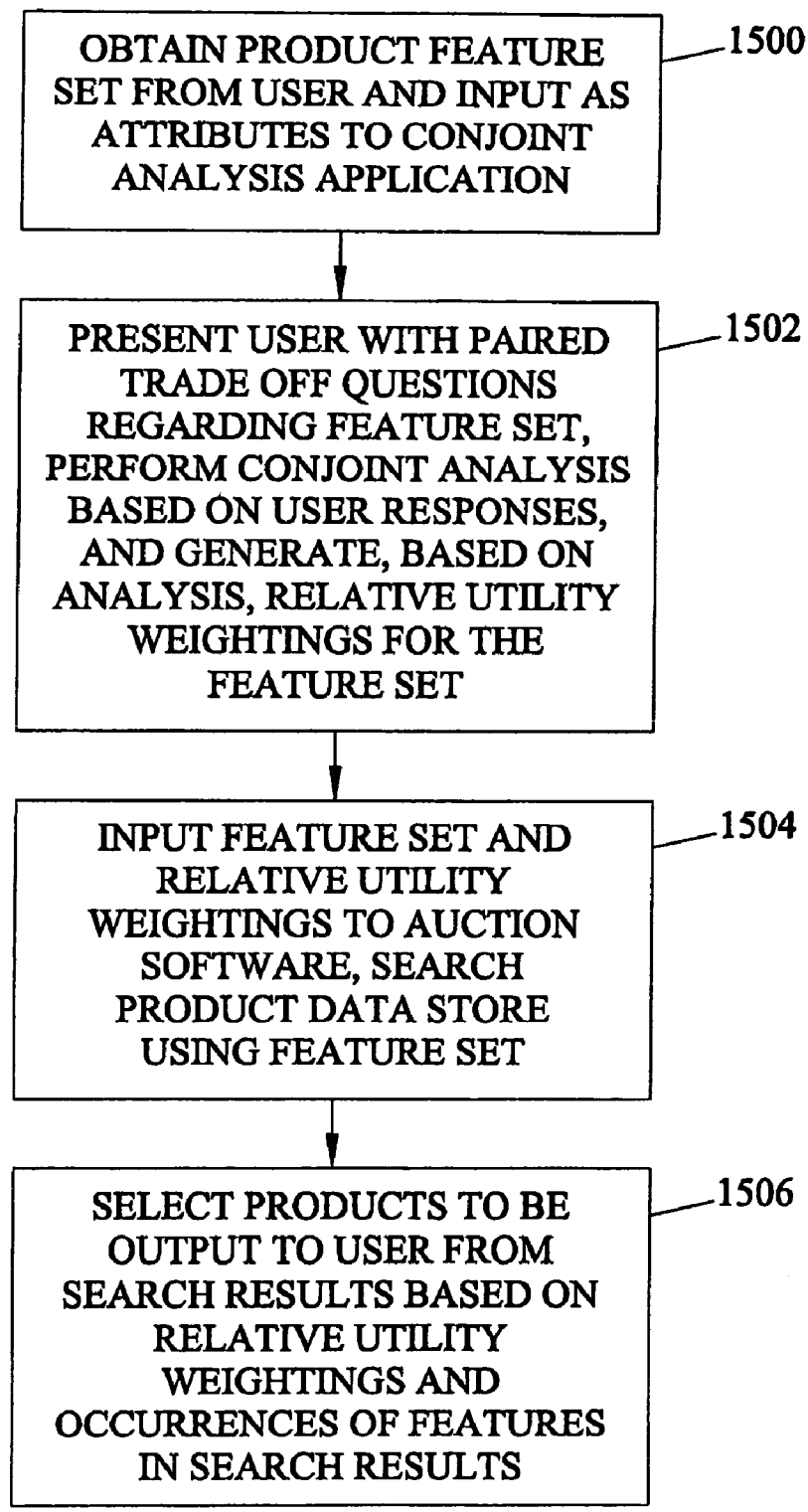
FIG. 15 is a block diagram illustrating an exemplary process for using conjoint analysis to facilitate user interaction with auction software according to an embodiment of the subject matter described herein.

FIG. 15 is a flow chart illustrating exemplary steps for combining conjoint analysis software and auction software according to an embodiment of the subject matter described herein. Referring to FIG. 15, in step 1500, product feature set is obtained from a user and input to a conjoint analysis application as attributes. In step 1502, the user is presented with paired trade-off questions regarding the feature set. A conjoint analysis is performed based on user responses to the trade-off questions. Based on the analysis, relative utility weightings are generated for the feature set. In step 1504, the feature set and relative utility weightings are input to auction software. The auction product data store is searched using the feature set. In step 1506, products to be output to the user for bidding may be selected based on the relative utilities and the occurrences of the features in the search results. For example, search results with a high number of features that match high utility features computed by the conjoint analysis application may be displayed before products that have the same number of features that match low utility features output by the conjoint analysis application.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for facilitating user interaction with customer relationship management (CRM) software using conjoint analysis, the method comprising:
    (a) performing, by a computer processing unit, a conjoint analysis using data obtained from a user, wherein performing the conjoint analysis includes executing a conjoint analysis software application that:
        (i) presents a user with paired trade-off questions regarding opposite extreme settings of different attributes;
        (ii) requires the user to consider jointly the opposite extreme settings of the different attributes by presenting to the user in a given pair of the trade-off questions a first endpoint setting of a first attribute and a second endpoint setting of a second attribute and requiring the user to either select between or rate the importance of difference between the first endpoint setting of the first attribute and the second endpoint setting of the second attribute;
        (iii) receiving receives user responses to the questions, and
        (iv) outputs, based on the responses, a conjoint-based feature profile of attributes of the products or services selected by the user, wherein the attributes in the conjoint-based feature profile are rated according to their relative utilities;
    (b) using results from the conjoint analysis to drive a CRM software application by:
        (i) inputting the conjoint-based feature profile to the CRM software application; and
        (ii) using the conjoint-based feature profile to return a product or service that matches a user's preferences wherein the conjoint analysis software application and the customer relationship management software application are each embodied in a computer readable medium.

2. The method of claim 1 wherein the products or services include real estate products or services.

3. The method of claim 1 wherein the products or services include consumer goods.

4. The method of claim 1 wherein using results from the conjoint analysis to drive a CRM software application includes automatically communicating products or services that match utilities computed using the conjoint analysis to the user.

5. A method for combining conjoint analysis with a search engine to facilitate user interaction with the search engine, the method comprising:
 (a) performing, by a computer processing unit, a conjoint analysis including executing a conjoint analysis software application that
  (i) presents a user with importance of difference trade-off questions regarding a plurality of different search engine keywords
  (ii) requires the user to consider jointly opposite extreme settings of attributes corresponding to the keywords by presenting to the user in a given pair of the trade-off questions a first endpoint setting of a first attribute and a second endpoint setting of a second attribute and requiring the user to either select between or rate the importance of difference between the first endpoint setting of the first attribute and the second endpoint setting of the second attribute,
  (iii) receives responses from the user, and
  (iv) applies conjoint analysis compute relative weights to the keywords in the set; and
 (b) communicating, from the conjoint analysis software application to a search engine, the keywords and the relative weights and wherein the conjoint analysis software application and the search engine are each embodied in a non-transitory computer readable medium.

6. The method of claim 5 comprising performing a search of a database using the keywords and the search engine and selecting results to be output to the user based on occurrences of the keywords in results of the search and the relative weights.

7. A method for using conjoint analysis to facilitate user interaction with a search engine, the method comprising:
 (a) receiving search keywords from a user and inputting the search keywords as attributes to a conjoint analysis software application;
 (b) using, by a computer processing unit, the conjoint analysis software application:
  (i) presenting the user with paired trade-off questions regarding the keywords
  (ii) requiring the user to consider jointly opposite extreme settings of attributes corresponding to the keywords by presenting the user in a given pair of the trade-off questions a first endpoint setting of a first attribute and a second endpoint setting of a second attribute and requiring the user to either select between or rate the importance of difference between the first endpoint setting of the first attribute and the second endpoint setting of the second attribute;
  (iii) performing conjoint analysis based on user responses to the questions;
  (iv) generating, based on the conjoint analysis, relative importance weightings for the keywords; and
  (v) inputting the keywords and relative importance weightings to a search engine; and
 (c) using the search engine:
  (i) performing the search using the keywords; and
  (ii) selecting results of the search to be output to the user using occurrences of the keywords in results of the search and the relative importance weightings, wherein the conjoint analysis software application and the search engine are each embodied in a non-transitory computer readable medium.

8. A method for combining conjoint analysis with auction software to facilitate user interaction with the auction software, the method comprising:
 (a) obtaining a product feature set from a user and inputting the product feature set as attributes to a conjoint analysis application;
 (b) using, by a computer processing unit, the conjoint analysis software application:
  (i) presenting the user with paired trade-off questions regarding the feature set; requiring the user to consider jointly opposite extreme settings of features in the feature set by presenting to the user in a given pair of the trade-off questions a first endpoint setting of a first feature and a second endpoint setting of a second feature and requiring the user to either select between or rate the importance of difference between the first endpoint setting of the first feature and the second endpoint setting of the second feature;
  (ii) performing conjoint analysis based on the user's responses to the questions; generating, based on the conjoint analysis, relative utility weightings for the features in the feature set; and
  (iii) inputting the keywords and the feature set to an auction software application; and
 (c) using the auction software application:
  (i) searching a product data store using the feature set; and
  (ii) selecting products to be output to the user for bidding based on the relative utility weightings, wherein the conjoint analysis software application and the auction software application are each embodied in a non-transitory computer readable medium.

9. A system for facilitating user interaction with customer relationship management (CRM) software using conjoint analysis, the system comprising a computer processor unit and further comprises:
 (a) a conjoint analysis software application for:
  (i) receiving a set of features from a user, for treating the features as attributes,
  (ii) presenting the user with paired trade-off questions for the features;
  (iii) requiring the user to consider jointly opposite extreme settings of the features by presenting to the user in a given pair of the trade-off questions a first endpoint setting of a first feature and a second endpoint setting of a second feature and requiring the user to either select between or rate the importance of difference between the first endpoint setting of the first feature and the second endpoint setting of the second feature,
  (iv) performing conjoint analysis based on responses to the questions,
  (v) generating, based on the conjoint analysis, relative utilities for the features, and
  (vi) outputting the features and the relative utilities;
 (b) a CRM software application for receiving the features and the relative utilities, for searching a product or service database using the features and relative utilities, and for selecting, from results of the search, products or services to be output to the user based on the relative utilities and occurrences of the features in the results;
 (c) wherein the conjoint analysis software application provides the relative utilities and features as input to the CRM software application; and (d) wherein the conjoint analysis software application and the CRM software application are each embodied in a computer readable medium.

10. A system for facilitating user interaction with a search engine using conjoint analysis, the system comprising a computer processor unit and further comprises:
   (a) a conjoint analysis software application for:
      (i) receiving user keyword selections and treating the keywords as attributes;
      (ii) presenting the user with paired trade-off questions regarding the keywords
      (iii) requiring the user to consider jointly opposite extreme settings of attributes corresponding to the keywords consider by presenting to the user in a given pair of the trade-off questions a first endpoint setting of a first attribute and a second endpoint setting of a second attribute and requiring the user to either select between or rate the importance of difference between the first endpoint setting of the first attribute and the second endpoint setting of the second attribute;
      (iv) performing conjoint analysis based on user responses to the questions;
      (v) generating, based on the analysis, relative importance weightings for the keywords; and
      (vi) outputting the keywords and the relative importance weightings; and
   (b) a search engine for receiving, from the conjoint analysis software application the keywords and the relative importance weightings, for searching a search space using the keywords and the weightings and outputting results of the search to the user, wherein the conjoint analysis software application and the search engine are each embodied in a computer readable medium.

11. A system for facilitating user interaction with auction software using conjoint analysis, the system comprising a computer processor unit and further comprises:
   (a) a conjoint analysis application for:
      (i) obtaining a product feature set from a user and storing the feature set as attributes;
      (ii) presenting the user with paired trade-off questions regarding the feature set
      (iii) requiring the user to consider jointly opposite extreme settings of features in the feature set by presenting to the user in a given pair of the trade-off questions a first endpoint setting of a first feature and a second endpoint setting of a second feature and requiring the user to either select between or rate the importance of difference between the first endpoint setting of the first feature and the second endpoint setting of the second feature;
      (iv) performing conjoint analysis based on user responses to the questions; generating, based on the conjoint analysis, relative utility weightings for the features in the feature set; and
      (vi) outputting the feature set and the relative utility weightings; and
   (b) an auction software application for receiving the feature set and the relative utility weightings, for searching a product data store using the feature set, and for using the weights to select, from results of the search, products to be output to the user based on occurrences of the feature set in the results and the weightings, wherein the conjoint analysis software application and the auction application are each embodied in a computer readable medium.

12. A computer program product comprising computer-executable instructions embodied in a non-transitory computer-readable medium for performing steps comprising:
   (a) performing a conjoint analysis using data obtained from a user, wherein performing the conjoint analysis includes executing a conjoint analysis software application that:
      (i) presents a user with paired trade-off questions regarding opposite extreme settings of different attributes and requires the user to consider jointly the opposite extreme settings of the different attributes by presenting to the user in a given pair of the trade-off questions a first endpoint setting of a first attribute and a second endpoint setting of a second attribute and requiring the user to either select between or rate the importance of difference between the first endpoint setting of the first attribute and the second endpoint setting of the second attribute;
      (ii) receiving, receives user responses to the questions, and
      (iii) outputs based on the responses, a conjoint-based feature profile of attributes of the products or services selected by the user, wherein the attributes in the conjoint-based feature profile are rated according to their relative utilities;
   (b) using results from the conjoint analysis to drive a customer relationship management (CRM) software application by:
      (i) inputting the conjoint-based feature profile to the CRM software application; and
      (ii) the conjoint-based feature profile to return a product or service that matches a user's preferences; wherein the conjoint analysis software and the customer relationship management software are each embodied in the non-transitory computer readable medium.

13. A computer program product comprising computer-executable instructions embodied in a non-transitory computer-readable medium for performing steps comprising:
   (a) performing a conjoint analysis including executing a conjoint analysis software application that
      (i) presents a user with importance of difference trade-off questions regarding a plurality of different search engine keywords corresponding to the keywords;
      (ii) attributes by presenting to the user in a given pair of the trade-off questions a first endpoint setting of a first attribute and a second endpoint setting of a second attribute and requiring the user to either select between or rate the importance of difference between the first endpoint setting of the first attribute and the second endpoint setting of the second attribute;
      (iii) receives responses from the user, and applies conjoint analysis compute relative weights to the keywords in the set; and
   (b) communicating, from the conjoint analysis software application to a search engine, the keywords and the relative weights and wherein the conjoint analysis software application and the search engine are each embodied in the non-transitory computer readable medium.

14. A computer program product comprising computer-executable instructions embodied in a non-transitory computer-readable medium for performing steps comprising:
   (a) receiving search keywords from a user and inputting the search keywords as attributes to a conjoint analysis application;

(b) using the conjoint analysis application:
  (i) presenting the user with paired trade-off questions regarding the attributes corresponding to the keywords;
  (ii) requiring the user to consider jointly opposite extreme settings of attributes by presenting to the user in a given pair of the trade-off questions a first endpoint setting of a first attribute and a second endpoint setting of a second attribute and requiring the user to either select between or rate the importance of difference between the first endpoint setting of the first attribute and the second endpoint setting of the second attribute;
  (iii) performing conjoint analysis based on user responses to the questions;
  (iv) generating, based on the conjoint analysis, relative importance weightings for the keywords; and
  (v) inputting the keywords and relative importance weightings to a search engine; and
(c) using the search engine:
  (i) performing the search using the keywords; and
  (ii) selecting results of the search to be output to the user using occurrences of the keywords in results of the search and the relative importance weightings, wherein the conjoint analysis software application and the search engine are each embodied in the non-transitory computer readable medium.

15. A computer program product comprising computer-executable instructions embodied in a non-transitory computer-readable medium for performing steps comprising:

(a) obtaining a product feature set from a user and inputting the product feature set as attributes to a conjoint analysis application;
(b) using the conjoint analysis software application:
  (i) presenting the user with paired trade-off questions regarding the feature set
  (ii) requiring the user to consider jointly opposite extreme settings of features in the feature set by presenting to the user in a given pair of the trade-off questions a first endpoint setting of a first feature and a second endpoint setting of a second feature and requiring the user to either select between or rate the importance of difference between the first endpoint setting of the first feature and the second endpoint setting of the second feature;
  (iii) performing conjoint analysis based on the user's responses to the questions;
  (iv) generating, based on the conjoint analysis, relative utility weightings for features in the feature set; and inputting the keywords and the feature set to an auction software application; and
(c) using the auction software application:
  (i) searching a product data store using the feature set; and
  (ii) selecting products to be output to the user for bidding based on the relative utility weightings, wherein the conjoint analysis software application and the auction software application are each embodied in the non-transitory computer readable medium.

* * * * *